United States Patent
Uzbekov et al.

(10) Patent No.: US 11,720,881 B2
(45) Date of Patent: Aug. 8, 2023

(54) DISTRIBUTED PAYMENT PROCESSING USING CENTRALIZED PAYMENT PROCESSING PLATFORM

(71) Applicant: S1LK PAY Ltd., Astana (KZ)

(72) Inventors: Gani Uzbekov, Almaty (KZ);
Vyacheslav Yelisseyev, Almaty (KZ)

(73) Assignee: S1LK PAY Ltd., Astana (KZ)

( * ) Notice: Subject to any disclaimer, the term of this patent is extended or adjusted under 35 U.S.C. 154(b) by 0 days.

(21) Appl. No.: 17/968,865

(22) Filed: Oct. 19, 2022

(65) Prior Publication Data
US 2023/0140288 A1      May 4, 2023

Related U.S. Application Data

(60) Provisional application No. 63/273,790, filed on Oct. 29, 2021.

(51) Int. Cl.
*G06Q 20/34*      (2012.01)
*G06Q 20/36*      (2012.01)

(52) U.S. Cl.
CPC ......... *G06Q 20/351* (2013.01); *G06Q 20/352* (2013.01); *G06Q 20/3674* (2013.01)

(58) Field of Classification Search
CPC . G06Q 20/351; G06Q 20/352; G06Q 20/3674
USPC ......................................................... 705/44
See application file for complete search history.

(56) References Cited

U.S. PATENT DOCUMENTS

| | | | |
|---|---|---|---|
| 11,120,429 B2* | 9/2021 | Prabhu | G06Q 20/10 |
| 11,295,308 B1* | 4/2022 | Fortney | G06Q 20/4012 |
| 2010/0332334 A1* | 12/2010 | Kilfoil | G06Q 20/04 |
| | | | 705/16 |
| 2018/0047016 A1* | 2/2018 | Sarin | G06Q 20/3674 |
| 2018/0096327 A1* | 4/2018 | Barrett | G06Q 20/20 |
| 2018/0247301 A1* | 8/2018 | Gallo | G06Q 20/342 |
| 2019/0378120 A1* | 12/2019 | Berrod | G06Q 20/3821 |

(Continued)

FOREIGN PATENT DOCUMENTS

| | | | |
|---|---|---|---|
| DE | 102021205259 A1 * | 12/2021 | G06F 16/2282 |
| EP | 3712828 A1 * | 9/2020 | |

(Continued)

OTHER PUBLICATIONS

"The Future of the Mobile Payment as Electronic Payment System," by Zlatko Bezhovski. vol. 8, No. 8. 2016. pp. 127-132. (Year: 2016).*

(Continued)

*Primary Examiner* — Sara C Hamilton
(74) *Attorney, Agent, or Firm* — Georgiy L. Khayet

(57) ABSTRACT

Provided is a method for distributed payment processing using a centralized payment processing platform. The method includes creating, using an application, an account associated with the centralized payment processing platform; creating, using the application, a virtual payment card associated with the account; receiving a selection of a balance for the virtual payment card within a limit of the account; receiving a selection of a recipient for the virtual payment card; generating a token associated with the virtual payment card; and transferring the token to the recipient. The payments made with the virtual payment card are processed by the centralized payment processing platform.

18 Claims, 17 Drawing Sheets

(56) References Cited

U.S. PATENT DOCUMENTS

2020/0082375 A1    3/2020  Singhal et al.
2020/0167757 A1*   5/2020  Sharma .............. G06Q 20/4093
2020/0342443 A1*  10/2020  Edwards ............ G06Q 20/3567
2021/0406868 A1*  12/2021  Brightman ............. G06Q 20/42

FOREIGN PATENT DOCUMENTS

WO       2013155627 A1    10/2013
WO    WO-2019199422 A1 *  10/2019   ......... G06Q 20/3223

OTHER PUBLICATIONS

"Characteristics of Mobile Payment Procedures, " by Nina Kreyer; Key Pousttchi; and Klaus Turowski. 2002. pp. 10-22. (Year: 2002).*

* cited by examiner

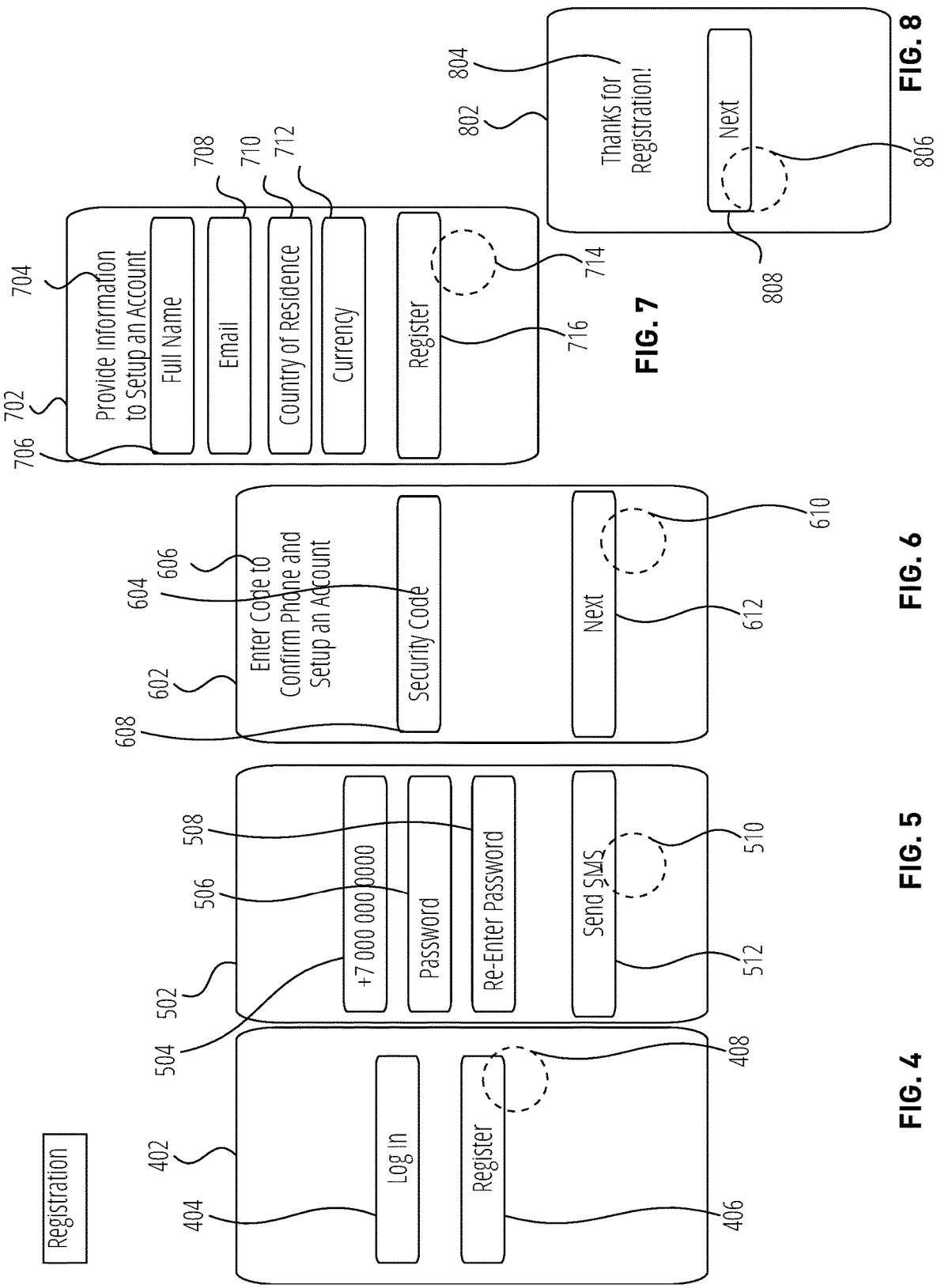

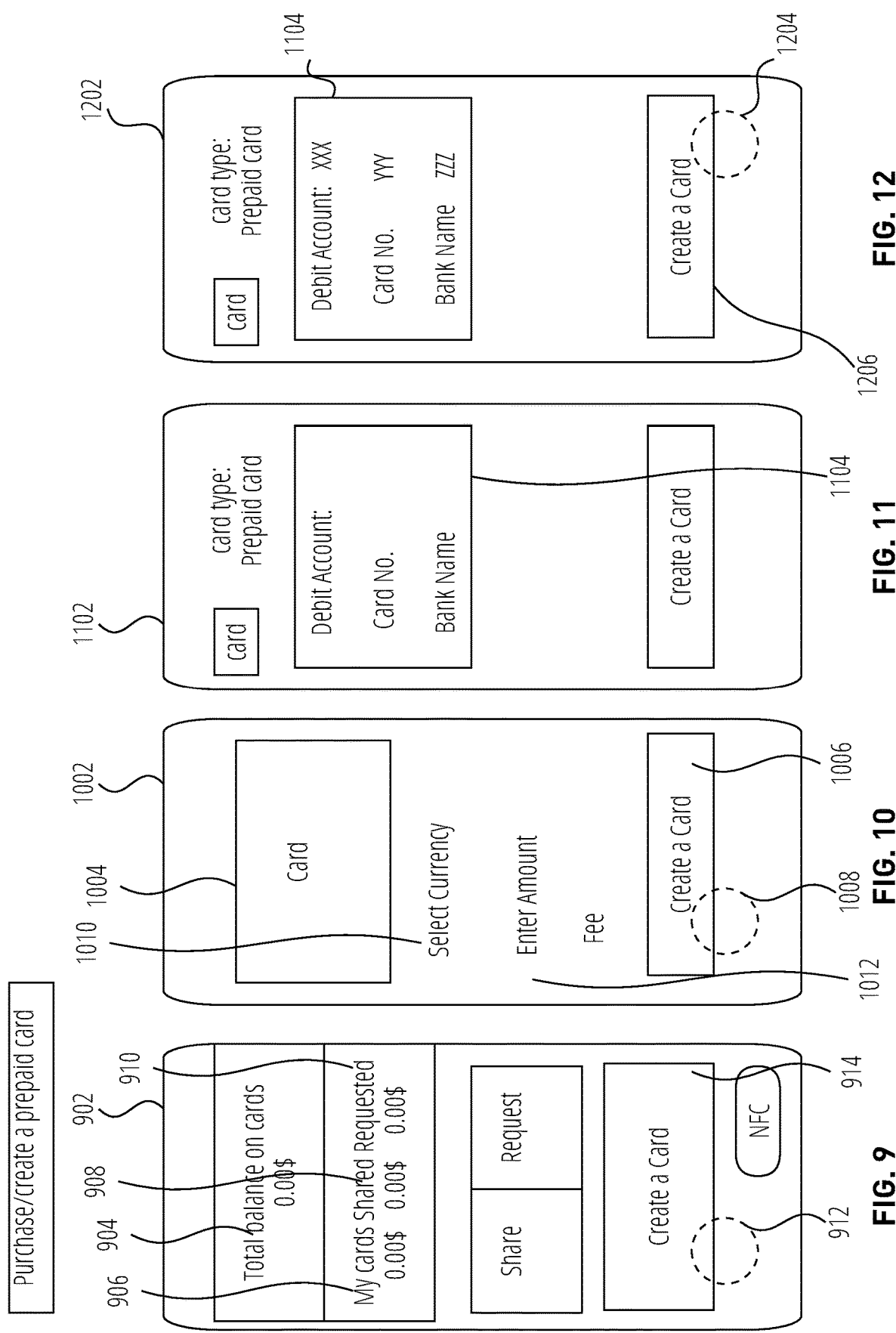

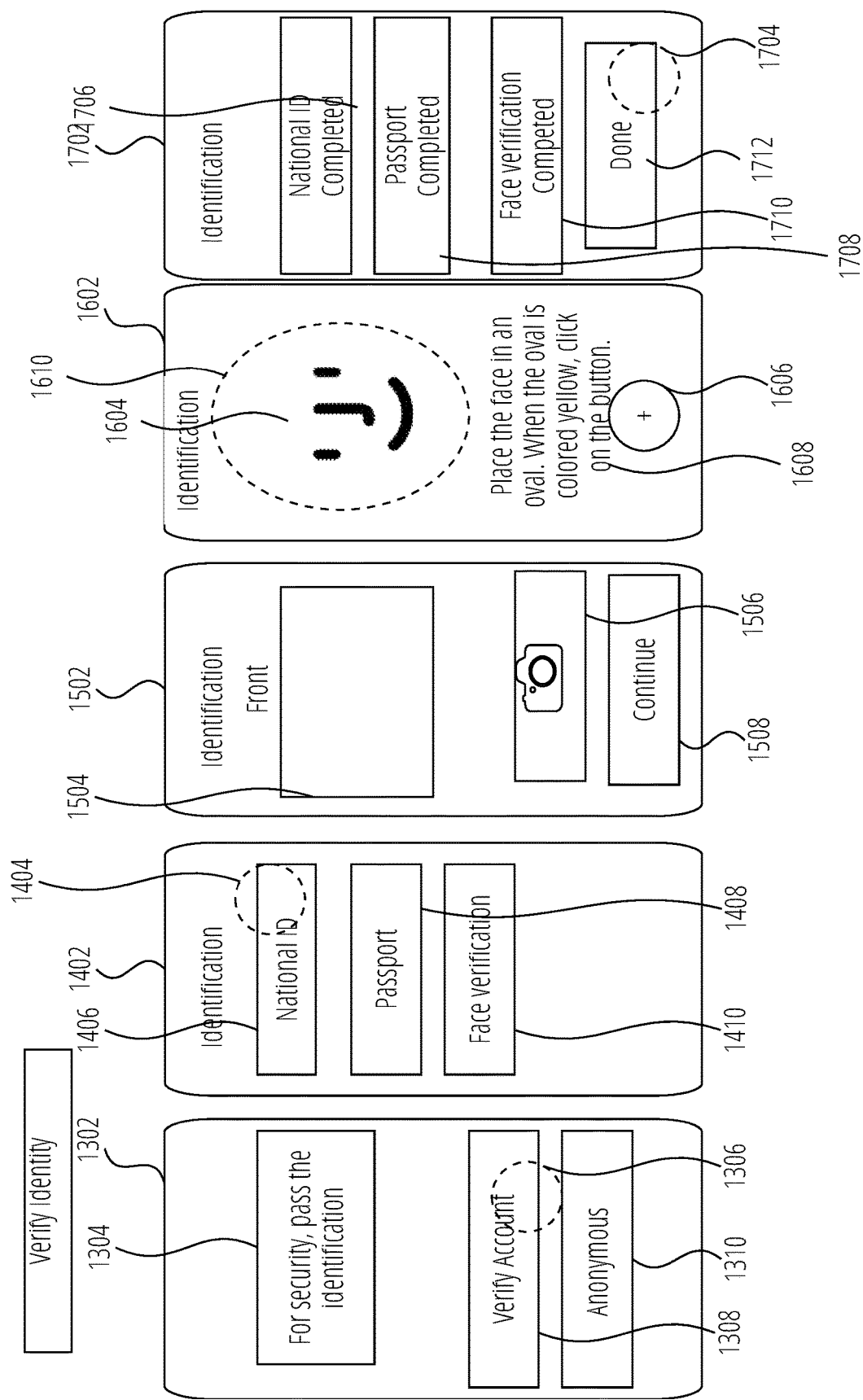

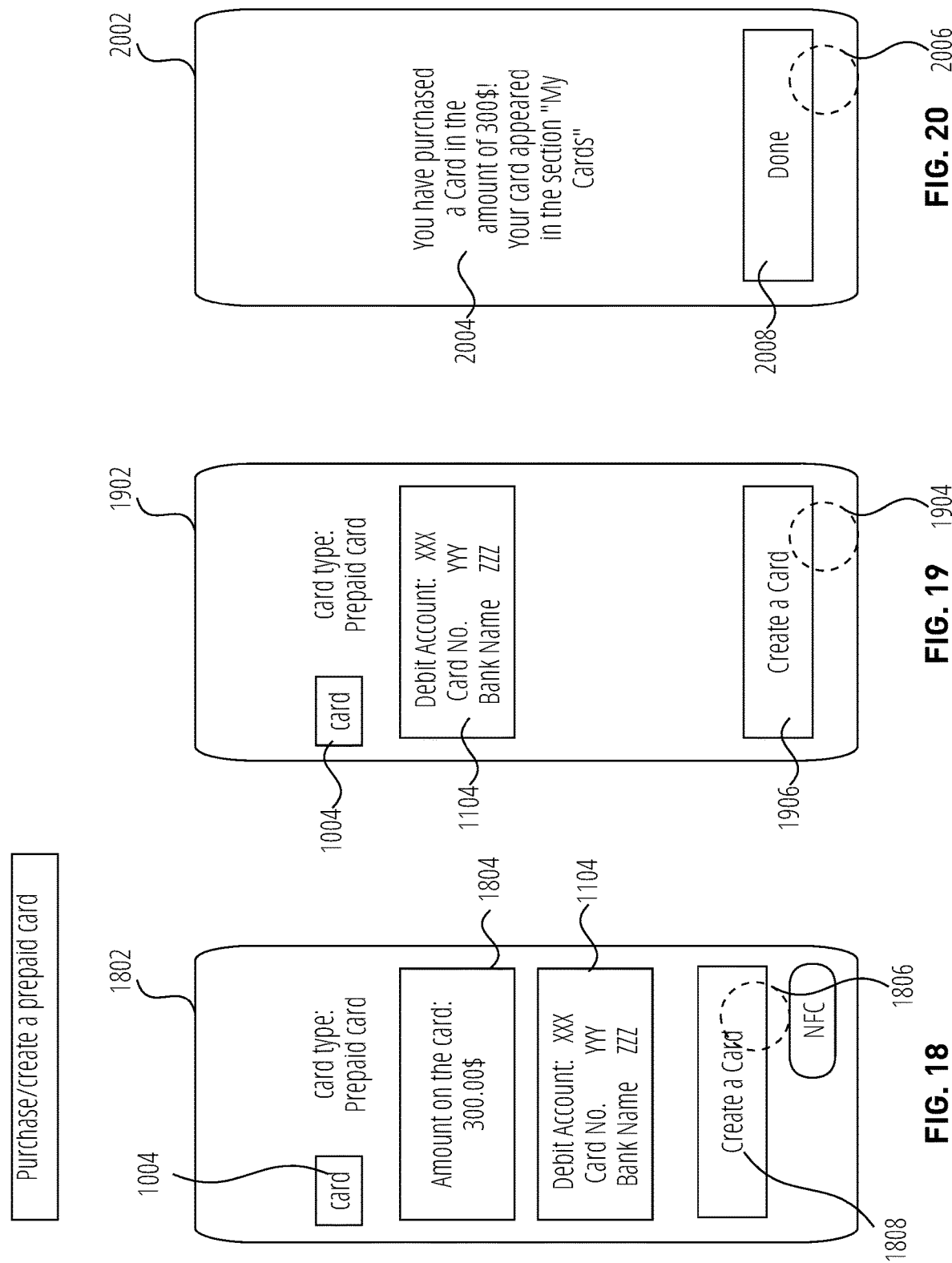

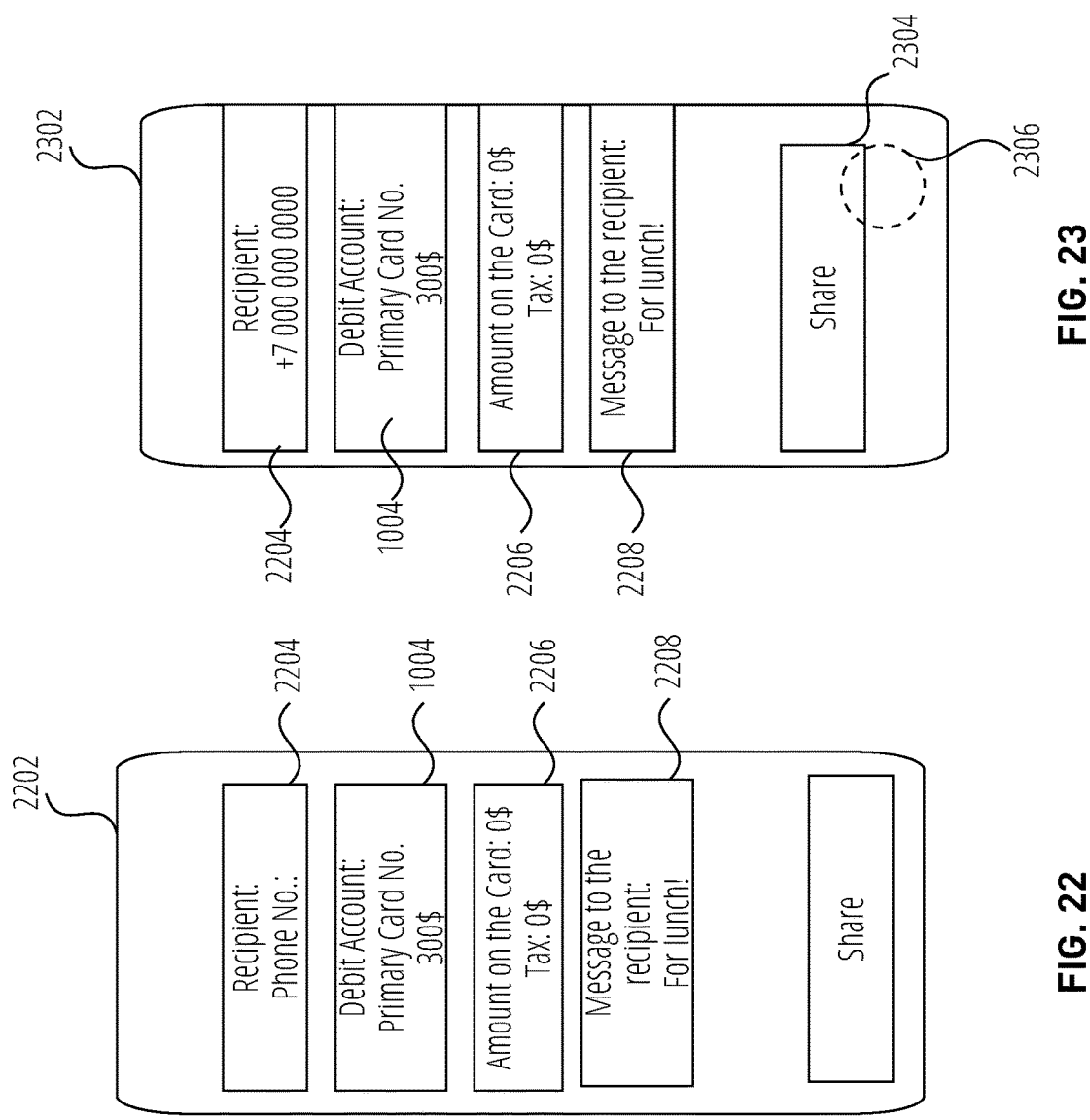
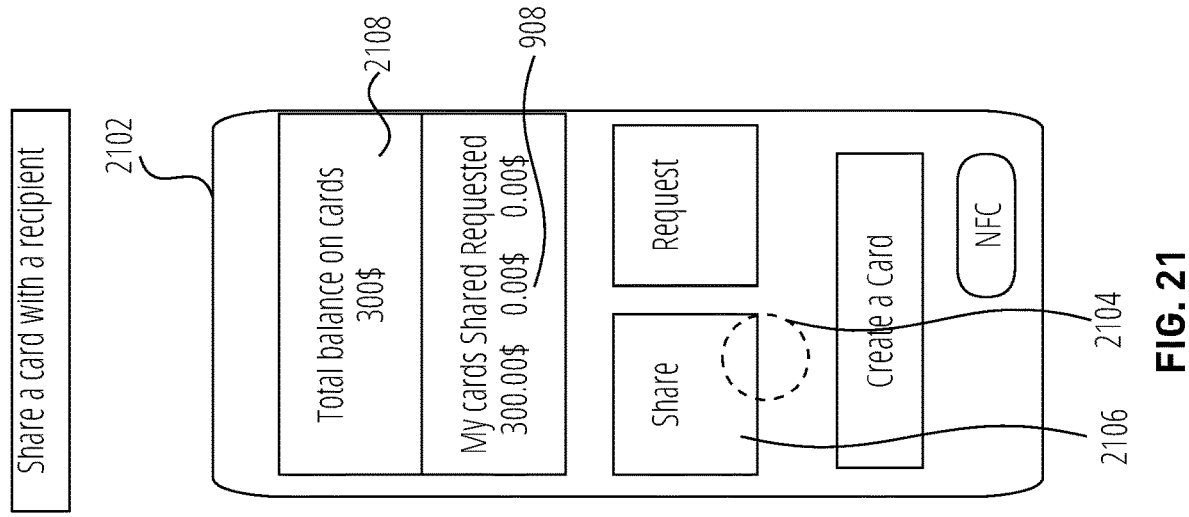
FIG. 21  FIG. 22  FIG. 23

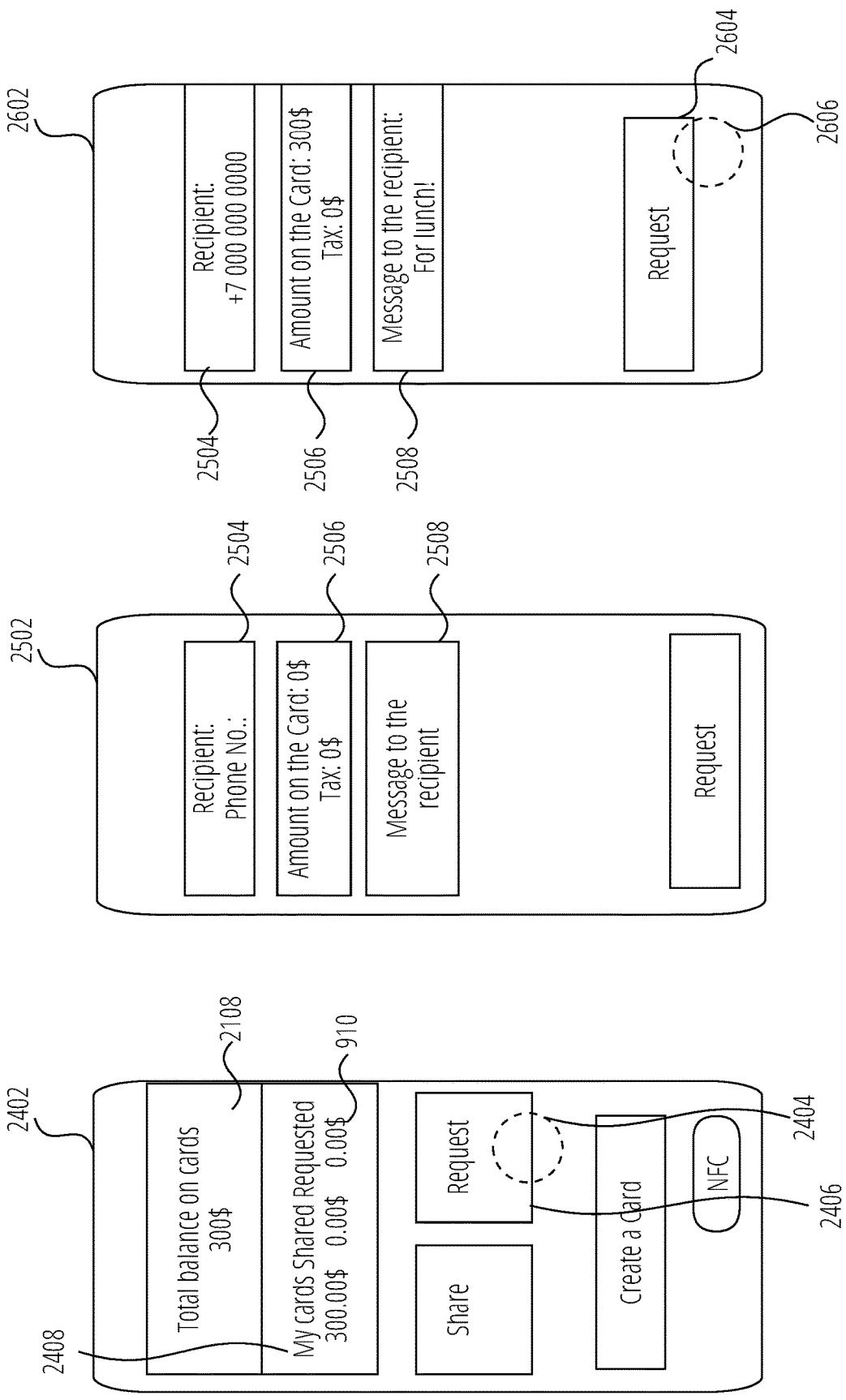

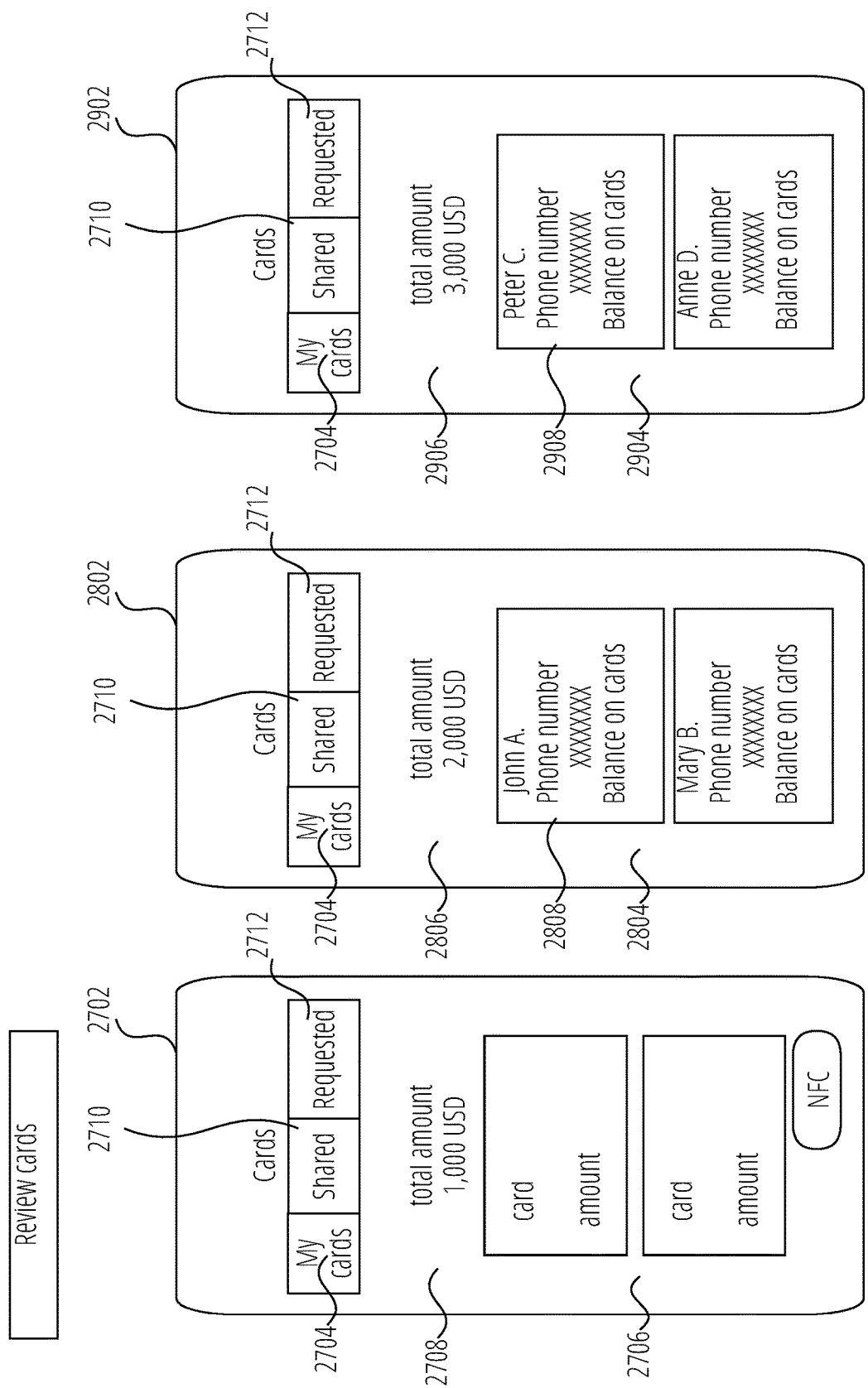

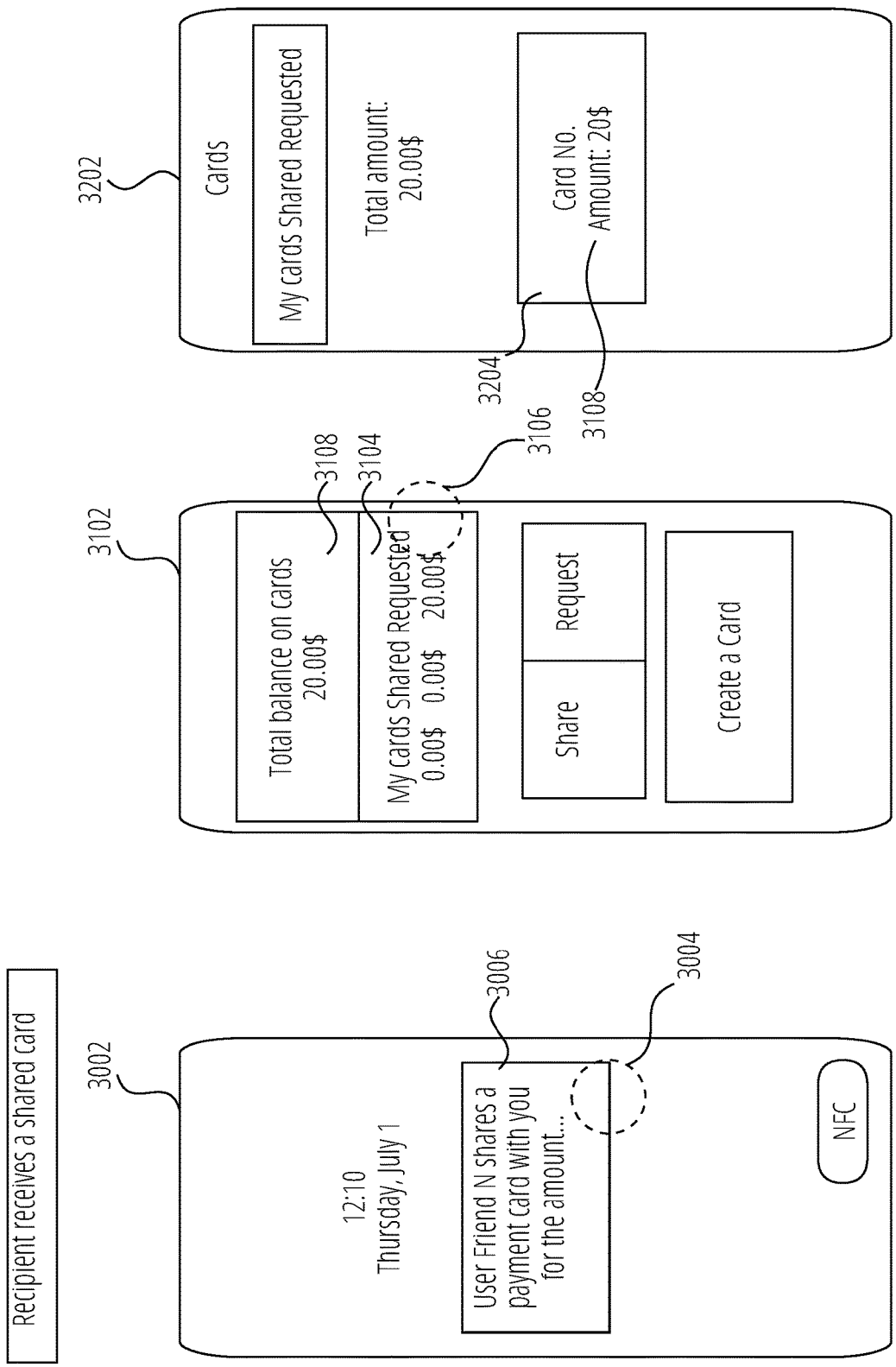

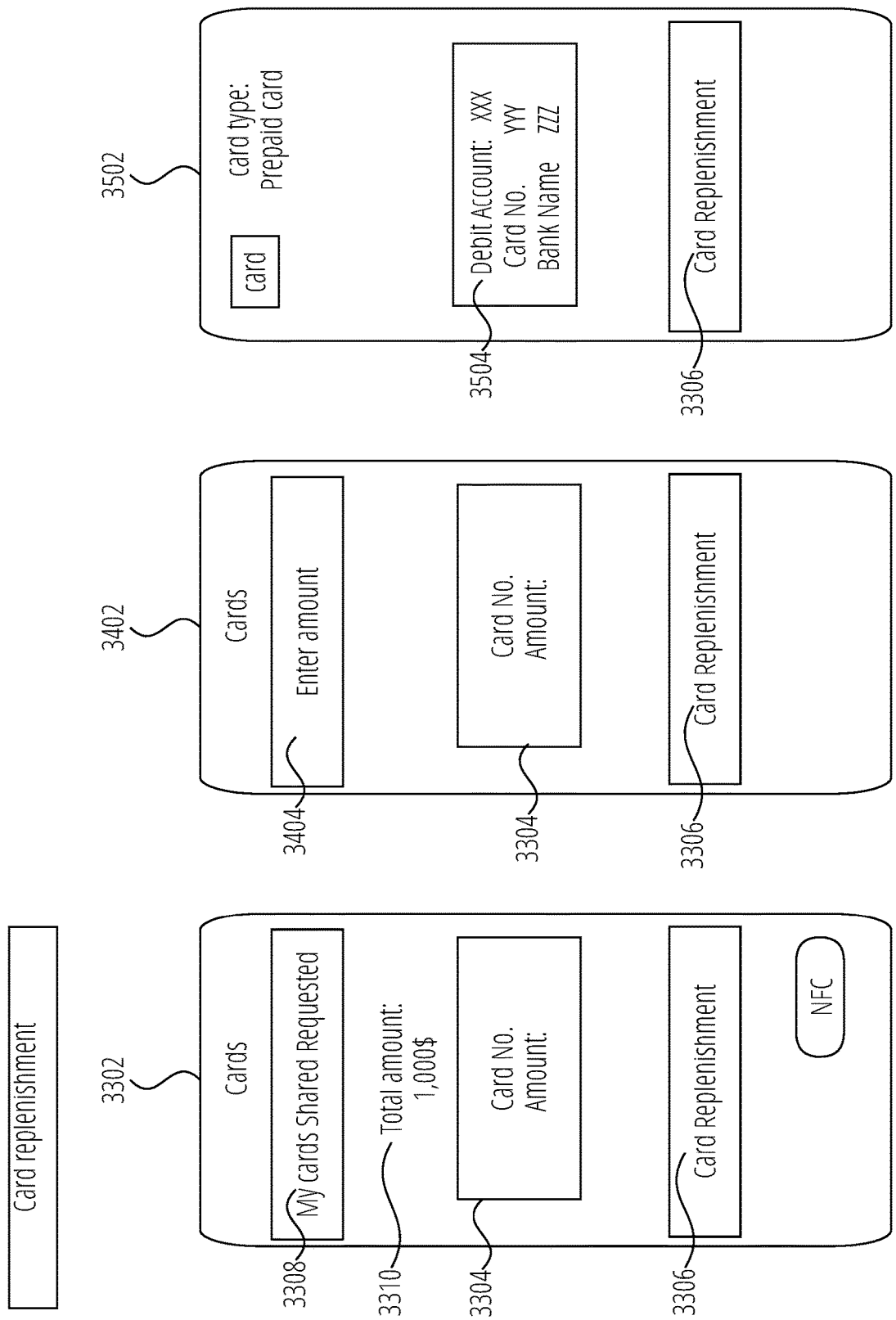

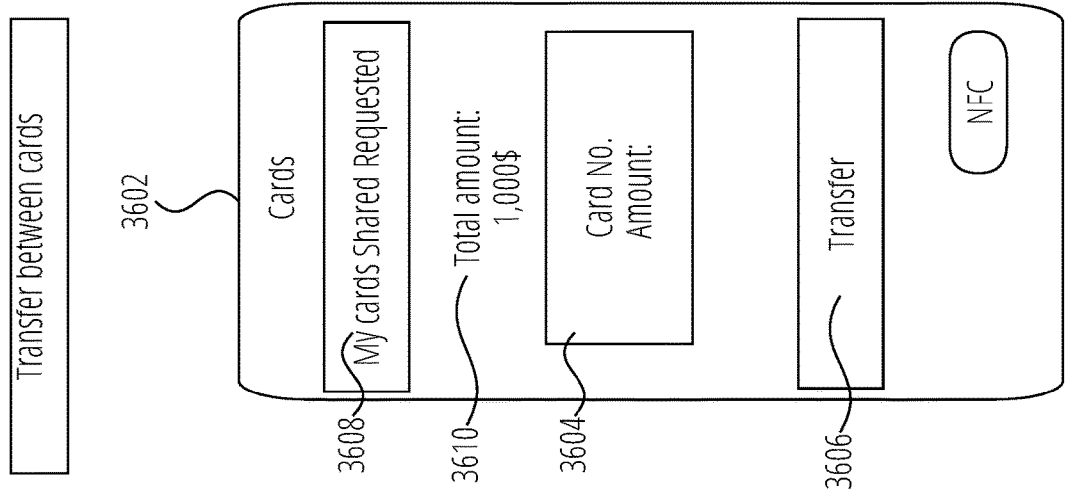

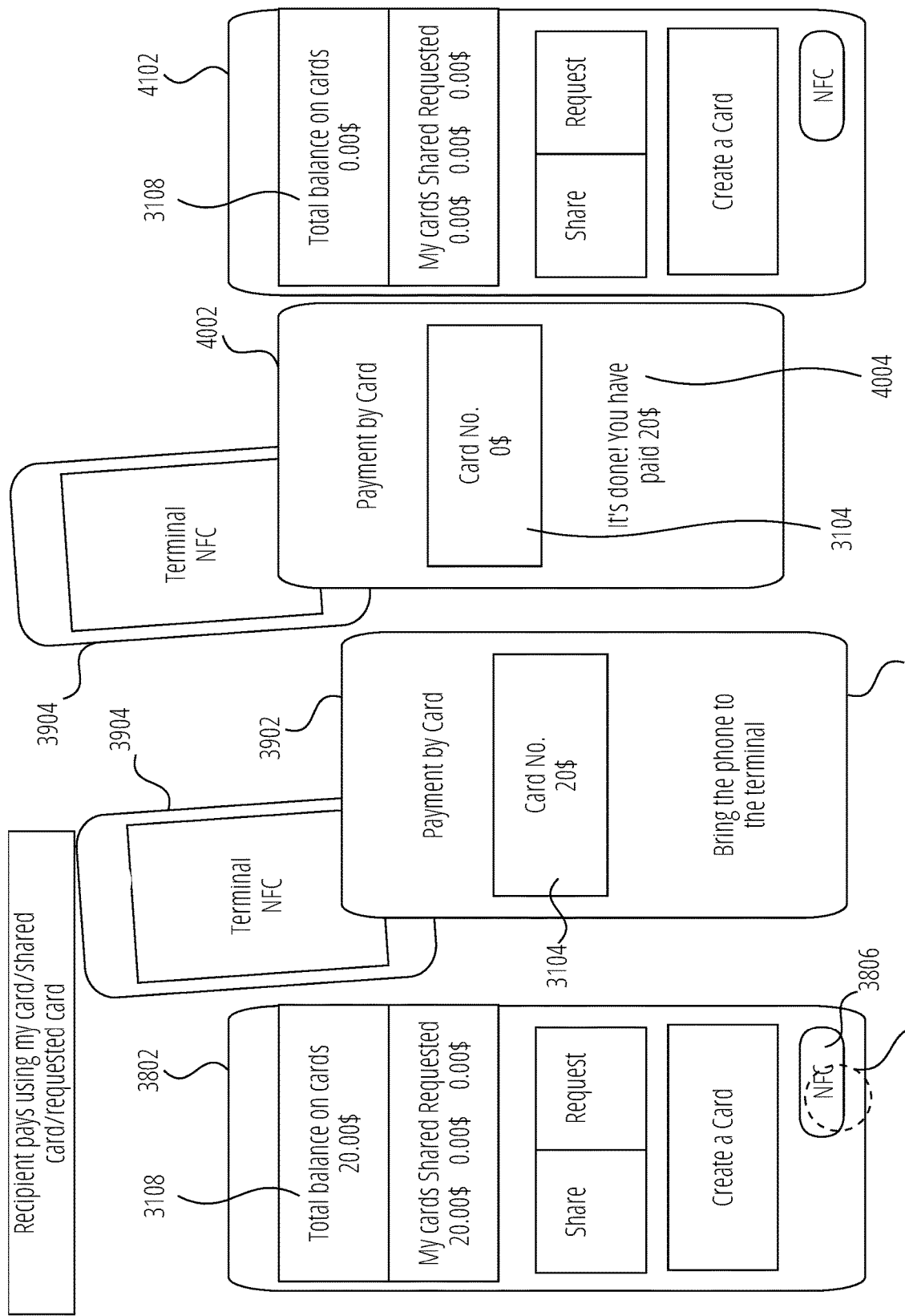

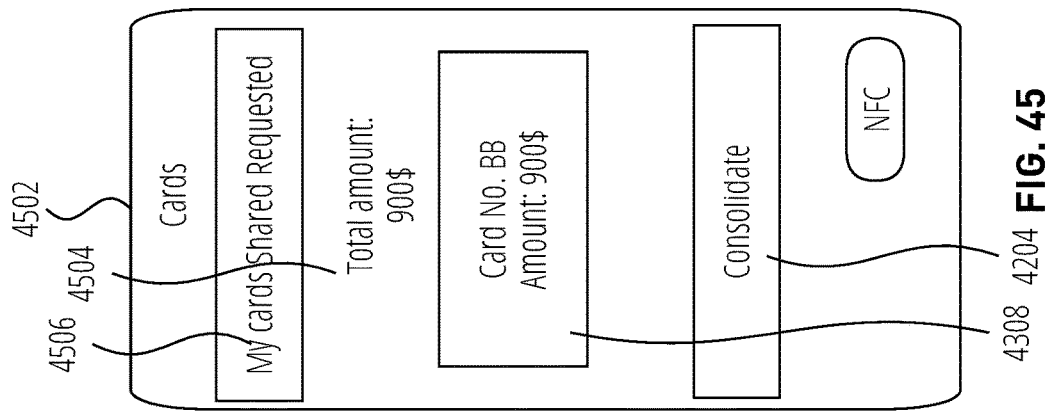
FIG. 42
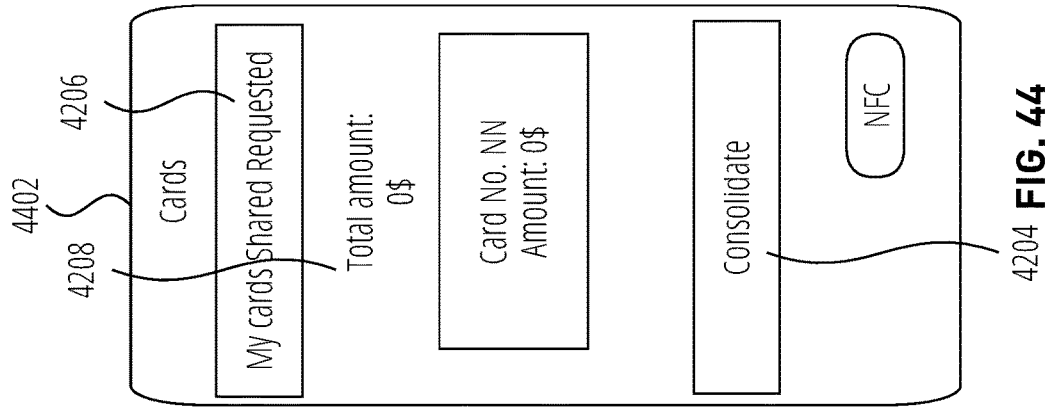
FIG. 43
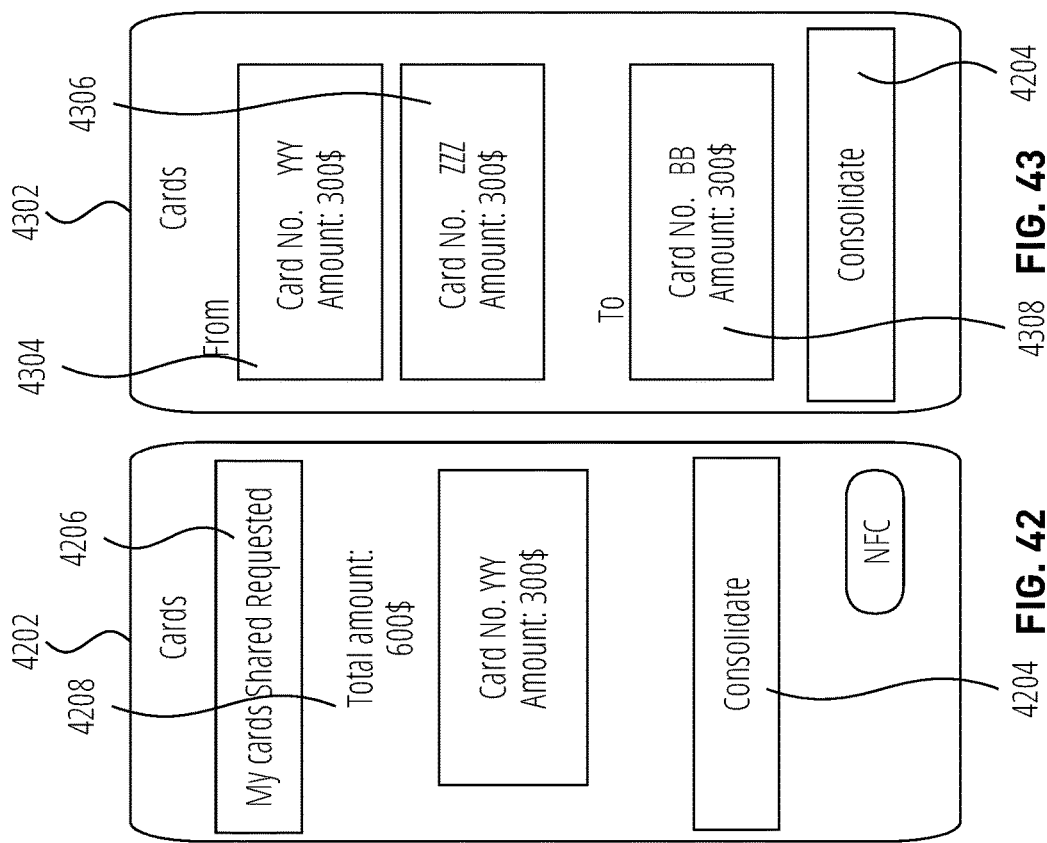
FIG. 44
FIG. 45

DISTRIBUTED PAYMENT PROCESSING USING CENTRALIZED PAYMENT PROCESSING PLATFORM

CROSS-REFERENCE TO RELATED APPLICATIONS

This application claims priority of U.S. Provisional Patent Application No. 63/273,790 filed on Oct. 29, 2021, entitled "DISTRIBUTED PAYMENT PROCESSING USING CENTRALIZED PAYMENT PROCESSING PLATFORM," which is incorporated herein by reference in its entirety.

TECHNICAL FIELD

This disclosure generally relates to the field of payment processing. More particularly, this disclosure relates to distributed payment processing using a centralized payment processing platform.

BACKGROUND

Banks can be slow when processing credit and debit card payments, especially in case of international payments. Moreover, performing financial transactions is a licensed type of activity in most jurisdictions and needs to be certified by MasterCard®, Visa®, UnionPay®, and other payment systems. Therefore, a fintech company attempting to decentralize payment processing and perform transactions may need substantial capital to obtain multiple authorizations to perform transaction-related activities in multiple jurisdictions.

Additionally, for recipients located abroad, transferring money from one bank account to another can present challenges and require payment of considerable transactional fees. In most cases, these recipients have to pay at least a cross border (foreign transaction) fee and often can have considerable delay in getting access to their funds. Moreover, transferring money from one account to another can be inconvenient in situations where there is an urgent need for funds while traveling (including foreign travel). In this case, sharing money with recipients can be associated with considerable difficulties, such as the need to open an account, transmitting the account number, paying interbank fees, internal bank fees, foreign transaction fees, performing an International Bank Account Number (IBAN) transfer, and so forth.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a method for distributed payment processing using a centralized payment processing platform is provided. The method may include creating, using an application, an account associated with the centralized payment processing platform. The method may further include creating, using the application, a virtual payment card associated with the account. The method may include receiving a selection of a balance for the virtual payment card within a limit of the account. The method may continue with receiving of a selection of a recipient for the virtual payment card. The method may continue with generating a token associated with the virtual payment card. The method may further include transferring the token to the recipient. The payments made with the virtual payment card may be processed by the centralized payment processing platform.

According to another example embodiment, a platform for distributed payment processing using a centralized payment processor is provided. The platform can include a processor and a memory in communication with the processor. The memory may store instructions executable by the processor. The processor may be configured to create, using an application, an account associated with the centralized payment processing platform. The processor can be configured to create, using the application, a virtual payment card associated with the account. The processor can be further configured to receive a selection of a balance for the virtual payment card within a limit of the account and receive a selection of a recipient for the virtual payment card. The processor may be configured to generate a token associated with the virtual payment card. After the token is created, the processor may transfer the token to the recipient. Payments made with the virtual payment card may be processed by the centralized payment processor.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

FIG. 4 shows a user interface that illustrates registration of a user in a platform for distributed payment processing using a centralized payment processor, according to an example embodiment.

FIG. 5 shows a user interface that illustrates registration of a user in a platform for distributed payment processing using a centralized payment processor, according to an example embodiment.

FIG. 6 shows a user interface that illustrates registration of a user in a platform for distributed payment processing using a centralized payment processor, according to an example embodiment.

FIG. 7 shows a user interface that illustrates registration of a user in a platform for distributed payment processing using a centralized payment processor, according to an example embodiment.

FIG. 8 shows a user interface that illustrates registration of a user with a platform for distributed payment processing using a centralized payment processor, according to an example embodiment.

FIG. 9 shows a user interface that illustrates providing a prepaid card to a user, according to an example embodiment.

FIG. 10 shows a user interface that illustrates providing a prepaid card to a user, according to an example embodiment.

FIG. 11 shows a user interface that illustrates providing a prepaid card to a user, according to an example embodiment.

FIG. 12 shows a user interface that illustrates providing a prepaid card to a user, according to an example embodiment.

FIG. 13 shows a user interface that illustrates verification of identity of a user, according to an example embodiment.

FIG. 14 shows a user interface that illustrates verification of identity of a user, according to an example embodiment.

FIG. 15 shows a user interface that illustrates verification of identity of a user, according to an example embodiment.

FIG. 16 shows a user interface that illustrates verification of identity of a user, according to an example embodiment.

FIG. 17 shows a user interface that illustrates verification of identity of a user, according to an example embodiment.

FIG. 18 shows a user interface that illustrates completion of purchasing of a prepaid card by a user, according to an example embodiment.

FIG. 19 shows a user interface illustrating completion of purchasing a prepaid card by a user, according to an example embodiment.

FIG. 20 shows a user interface illustrating completion of purchasing a prepaid card by a user, according to an example embodiment.

FIG. 21 illustrates a user interface that shows sharing access to a card with a recipient by a user, according to an example embodiment.

FIG. 22 illustrates a user interface that shows sharing access to a card with a recipient by a user, according to an example embodiment.

FIG. 23 illustrates a user interface that shows sharing access to a card with a recipient by a user, according to an example embodiment.

FIG. 24 illustrates a user interface that shows requesting a recipient to share a virtual payment card with a user, according to an example embodiment.

FIG. 25 illustrates a user interface that shows requesting a recipient to share a virtual payment card with a user, according to an example embodiment.

FIG. 26 illustrates a user interface that shows requesting a recipient to share a virtual payment card with a user, according to an example embodiment.

FIG. 27 illustrates a user interface for reviewing payment cards created by a user, according to an example embodiment.

FIG. 28 illustrates a user interface for reviewing payment cards shared by a user, according to an example embodiment.

FIG. 29 illustrates a user interface for reviewing payment cards requested by a user from other users, according to an example embodiment.

FIG. 30 shows a user interface provided on a further user device of a recipient and illustrating receiving an access by the recipient to an amount of money shared by a user, according to an example embodiment.

FIG. 31 shows a user interface that illustrates receiving access by a recipient to an amount of money shared by a user, according to an example embodiment.

FIG. 32 shows a user interface illustrating receiving an access by a recipient to an amount of money shared by a user, according to an example embodiment.

FIG. 33 illustrates a user interface that shows replenishments of virtual payment cards, according to an example embodiment.

FIG. 34 illustrates a user interface that shows replenishments of virtual payment cards, according to an example embodiment.

FIG. 35 illustrates a user interface that shows replenishments of virtual payment cards, according to an example embodiment.

FIG. 36 illustrates a user interface that shows transfer of money between virtual payment cards, according to an example embodiment.

FIG. 37 illustrates a user interface that shows transfer of money between virtual payment cards, according to an example embodiment.

FIG. 38 illustrates a process of performing a payment by a recipient using an additional card, according to an example embodiment.

FIG. 39 illustrates a process of performing a payment by a recipient using an additional card, according to an example embodiment.

FIG. 40 illustrates a process of performing a payment by a recipient using an additional card, according to an example embodiment.

FIG. 41 illustrates a process of performing a payment by a recipient using an additional card, according to an example embodiment.

FIG. 42 illustrates a user interface that shows consolidation of virtual payment cards, according to an example embodiment.

FIG. 43 illustrates a user interface that shows consolidation of virtual payment cards, according to an example embodiment.

FIG. 44 illustrates a user interface that shows consolidation of virtual payment cards, according to an example embodiment.

FIG. 45 illustrates a user interface that shows consolidation of virtual payment cards, according to an example embodiment.

DETAILED DESCRIPTION

Figure 1:
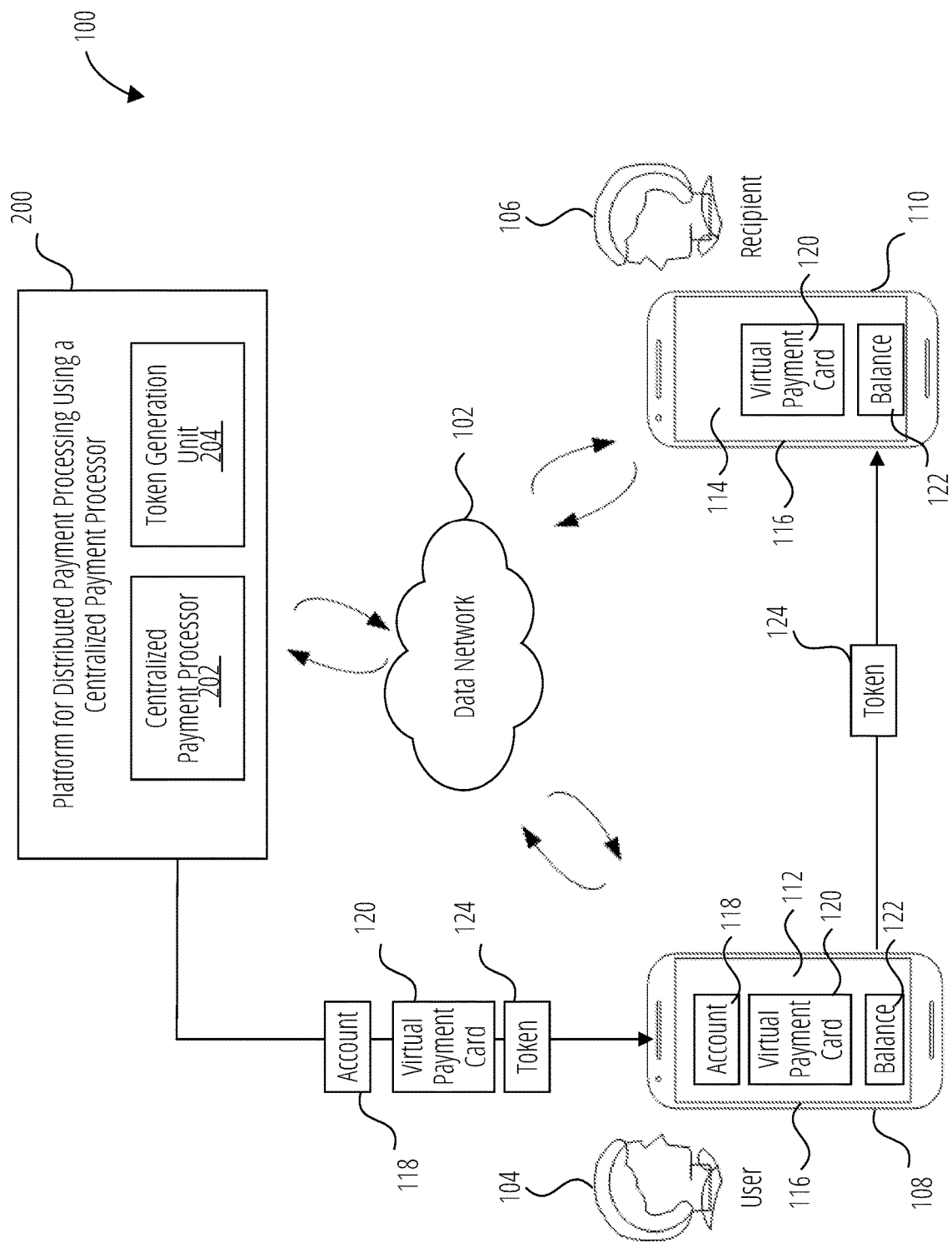
FIG. 1 shows an environment, within which systems and methods for distributed payment processing using a centralized payment processing platform can be implemented, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

In general, the present disclosure relates to methods for distributed payment processing using a centralized payment processing platform. The platform may include a centralized payment processor. A payment processor is a transactor for financial calculations that manages transactions from various channels such as credit and debit cards for acquiring banks. The centralized payment processor can be certified by payment systems, such as MasterCard®, Visa®, UnionPay®, and so forth and accredited to process transactions between all types of cards.

The platform can reside on remote servers and can be associated with an application running on a smartphone of a user. The platform can be used to decentralize finances of the user by allowing the user to make decisions on sharing an access to money in a user account with other users, setting limits for amounts of funds in the user account that can be used by other users, and other financial decisions. The user may provide the access to money on the user account digitally without the need for issuing any physical cards to other users.

First, to use the platform, the user needs to create an account associated with the centralized payment processing platform. The user may use an application associated with the platform and running on a user device to request that the platform create the account. In response to the request received from the user, the platform can create the account associated with the centralized payment processor of the platform.

Upon creating the account, the user may deposit funds into the account by any conventional means. For example, the user may transfer funds from any account or any credit or debit card that the user already has in any financial institution, e.g., a bank. In an example embodiment, to enable depositing funds into the account, a virtual payment card can be created and associated with the account of the user. The virtual payment card is also referred to herein as a payment card, a prepaid virtual payment card, or just a prepaid card. The amount of funds deposited onto the account may be displayed as deposited onto the virtual payment card. Therefore, the whole amount of funds of the account can be stored on the virtual payment card. If the user wants to share money with other users, a virtual payment card may be created as an additional virtual payment card by the user and used for sharing the funds with other users. Then, as soon as the user opens a prepaid card and deposits funds into the prepaid card, the user can immediately create one or more additional virtual payment cards (also referred herein to as additional cards) using the application and share the one or more additional virtual payment cards with family members, friends, or any other users.

In an example embodiment, upon creating the account and depositing funds into the account associated with the centralized payment processing platform (i.e., into the virtual payment card), the user may want to share access to the account with another user. The process of sharing the access to the account may commence with the user requesting to create a virtual payment card associated with the account. In response to the request, the centralized payment processor can create the virtual payment card for the user. Upon creating the virtual payment card, the user may specify a balance for the virtual payment card within the current limit of the account. The balance for the virtual payment card is an amount of money that the user wants to share with another user. Upon specifying the balance, the user may select a recipient of the virtual payment card. For example, the user may select the recipient from a contact list stored on the user device of the user or somewhere in a cloud storage or may enter a phone number of the recipient.

Upon receipt of the selection of the balance and the recipient, the platform may generate a token associated with the virtual payment card. The platform may be certified by international payment systems, such as MasterCard®, Visa®, UnionPay®, and so forth, to generate tokens associated with the virtual payment card linked to the account of the user. The token may include a dynamically generated unique identifier. The platform may generate the token based on predetermined criteria. In some example embodiments, the platform may request a partner financial institution to create the token associated with the virtual payment card. The partner financial institution may include a payment system, such as MasterCard®, Visa®, UnionPay®, a bank, and so forth. Upon receiving the token, the platform may transfer the token to the recipient.

The recipient may have the application associated with the platform running on a user device of the recipient. Upon receiving the token, a notification may be provided to the recipient in the application informing the recipient that the recipient has access to the virtual payment card. Upon receiving the token by the user device of the recipient, the application on the user device of the recipient may automatically add, based on the token, the virtual payment card to a digital wallet (e.g., Samsung Pay®, Apple Pay®, Google Pay®) installed on the user device of the recipient. In some example embodiments, the recipient may be enabled to manually add the data associated with the virtual payment card into the digital wallet.

Upon adding the virtual payment card into the digital wallet, the recipient may have access to the amount of funds limited by the balance selected by the user. The recipient may use the virtual payment card to perform payments using the user device of the recipient. Payments made with the virtual payment card by the recipient are processed by the centralized payment processor. Specifically, because the virtual payment card is associated with the account of the user, the amount of funds paid by the recipient for products or services using the virtual payment card is transferred from the account of the user to an account of a product or service provider.

In conventional money transfer systems and methods, funds are transferred from an account of one person to an account of another person. The platform disclosed herein allows a first user to provide a second user with an access to funds in an account of the first user without transferring funds between accounts of the users. Thus, sharing of the funds is performed by providing the second user with the access to the account of the first user instead of transferring the funds from one account to another. Because providing the second user with the access to the funds of the first user does not result in moving the funds anywhere from the account of the first user, no additional third parties (such as financial or legal institutions) are engaged and, accordingly, expenses for sharing the funds are much lower when compared to conventional money transfer methods. Thus, the second user does not need to have any bank accounts or credit or debit cards, but can have access to the account of the first user within the limit specified by the first user as a balance for the virtual payment card shared with the second user. All the second user needs to have to access the virtual payment card shared with the second user is a user device (e.g., a smartphone) with an application associated with the platform and running on the user device.

In an example embodiment, upon registering within the application, a user may need to pass an authentication procedure and an identification procedure. The authentication procedure and an identification procedure may be performed based on predetermined criteria, such as requesting biometrical data of the user, requesting personal data of the user, and so forth. Upon passing the authentication procedure and the identification procedure, the user may deposit any amount of funds onto the virtual payment card and share any amounts of funds with other users.

In some embodiments, the user may skip the step of performing the authentication procedure and the identification procedure. In this embodiment, the user may be limited to depositing and sharing a predetermined amount of funds, e.g., one hundred dollars, limited to a number of prepaid cards that the user purchase, e.g., only one card, limited to sharing operations, e.g., sharing one additional card with a recipient, and so forth. If the user skipped the authentication procedure and the identification procedure, the user may return to the step of performing the authentication procedure and the identification procedure any time later.

As the recipient selected by the user does not deposit any funds from any bank accounts, the recipient does not need to pass any identification or authorization procedures to access the virtual payment cards shared with the recipient by the user.

The platform can either issue virtual payment cards by itself or request that partner financial institutions (such as banks) issue cards on the behalf of the platform. In an example embodiment, the platform may establish communication with partner financial institutions in many foreign countries. A user located in a first country may request to share money with a recipient located in a second country. In this case, the platform may request a partner financial institution located in the second country to create a virtual payment card for the user. After the user shares access to the virtual payment card with the recipient, the recipient can perform payments using the virtual payment card in the second country. Therefore, as the virtual payment card is created by the partner financial institution in the second country and the payments are performed in the second country, no cross-border fees for performing an international payment is paid because the payment is performed within the second country. Therefore, the platform may create, for example, an opportunity for a person working in one country to buy a prepaid card, immediately create an additional card, and share the additional card (i.e., the virtual payment card) with a person in another country.

Similarly, when the user travels abroad from a first country to a second country, the platform may request a partner financial institution located in the second country to create a virtual payment card for the user. Furthermore, the platform may improve access to funds in locations with widespread mobile phone use but few banking services. In an example embodiment, the platform may have agreements with a partner financial institution (a first bank) servicing the existing account of the user in the first country and with a partner financial institution (a second bank) located in the second country. The first bank may have partner banks in the second country. Therefore, if a user of the first bank requests to perform a payment in the second country, the second bank may perform the payment internally in the second country as a partner of the first bank without performing an international transfer from the first bank to the second bank. Thus, the platform may request the second bank to create a token for an additional payment card that needs to be used in the second country. The platform may inform the second bank that the token is intended for a user of a first bank, which is a partner of the second bank in the first country. When the second bank receives the token, the second bank determines that the token is associated with an account in the first bank, which is a partner of the second bank. Based on the token, the second bank may perform the payment internally in the second country as a partner of the first bank without performing an international transfer from the first bank to the second bank. In some example embodiments, the platform may be authorized to create tokens for additional payment cards of any country and may not need to request any partner financial institutions to create tokens.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 illustrates an environment 100 within which systems and methods for distributed payment processing using a centralized payment processing platform can be implemented. The environment 100 may include a data network 102 (e.g., an Internet or a computing cloud), a user 104, a recipient 106, a user device 108 associated with the user 104, a further user device 110 associated with the recipient 106, and a platform 200 for distributed payment processing using a centralized payment processor (also referred to herein as a platform 200). The platform 200 may have a centralized payment processor 202 and a token generation unit 204. The user device 108 and further user device 110 may include a smartphone, a personal computer (PC), a desktop computer, a laptop, a tablet, and so forth.

The user device 108 and the further user device 110 may have a graphical user interface (GUI) associated with the platform 200. The GUI is shown as a user interface 112 associated with the user device 108 and a user interface 114 associated with the further user device 110. Furthermore, an application 116 may be running on each of the user device 108 and the further user device 110. The user interface 112 and the user interface 114 may be associated with the application 116. The user device 108, the further user device 110, and the application 116 may communicate with the platform 200 via the data network 102.

The data network 102 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth® radio, or an IEEE 802.11-based radio frequency network. The data network 102 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The user 104 may send, using the application 116 running on the user device 108, a request to the platform 200 to create an account associated with the centralized payment processor 202. In response to the request, the platform 200 can create, using the application 116, an account 118.

Upon creation of the account 118, the user 104 may want to share funds stored on the account 118 with the recipient 106. The user 104 may request to create a virtual payment card 120 associated with the account 118. In response to the request, the platform 200 can create, using the application 116, the virtual payment card 120 associated with the account 118.

The user 104 may specify a balance 122 for the virtual payment card 120 within a limit of the account 118. The user 104 may further select, e.g., from a list of contacts stored on the user device 108, the recipient 106 as a recipient for the virtual payment card 120.

Upon receiving the selection of the balance 122 and the recipient 106 from the user 104, the platform 200 may create, via the token generation unit 204, a token 124 associated with the virtual payment card 120. In some embodiments, the platform 200 may request a partner financial institution (not shown) to create a token 124 associated with the virtual payment card 120. The partner financial institution may create the token 124 and provide the token 124 to the platform 200. Upon creating the token by itself or receiving the token from the partner financial institution, the platform 200 may provide the token 124 to the user device 108 of the user 104. The user 104 may send the token 124 to the recipient 106.

The further user device 110 of the recipient 106 may receive the token 124. Based on the token 124, the further user device 110 may display the virtual payment card 120 of the user 104 on the user interface 114 of the further user device 110 to the recipient 106. The recipient 106 can also see the balance 122 available to the recipient 106. The recipient 106 can use the virtual payment card 120 to perform payments within the limit of the balance 122. The payments made by using the virtual payment card 120 may be processed by the centralized payment processor 202.

Figure 2:
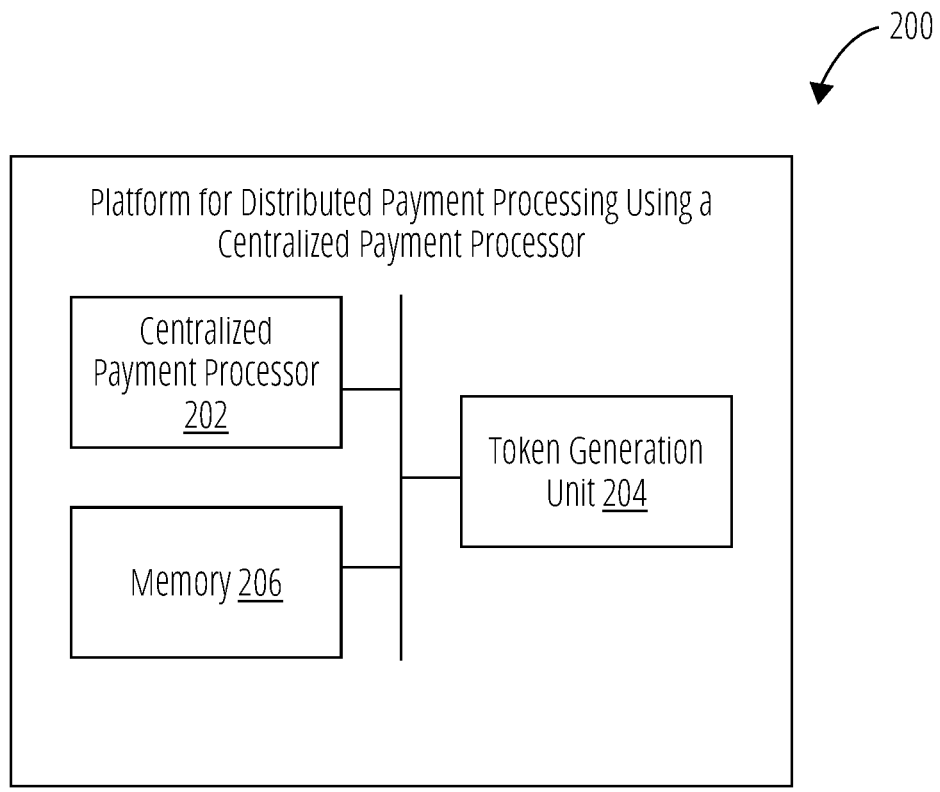
FIG. 2 is a block diagram illustrating a platform for distributed payment processing using a centralized payment processor, according to an example embodiment.

FIG. 2 is a block diagram illustrating a platform 200 for distributed payment processing using a centralized payment processor, according to an example embodiment. The platform 200 may include a centralized payment processor 202, a token generation unit 204, and a memory 206. In an example embodiment, the operations performed by token generation unit 204 may be performed by the centralized payment processor 202. In an example embodiment, the operations performed by the centralized payment processor 202 and the token generation unit 204 may be performed by a processor, for example, such as a processor shown in FIG. 47 as processor(s) 4702. The memory 206 may store instructions executable by the centralized payment processor 202 and the token generation unit 204. The operations performed by the centralized payment processor 202 and the token generation unit 204 of the platform 200 are described in detail below with reference to FIG. 3.

Figure 3:
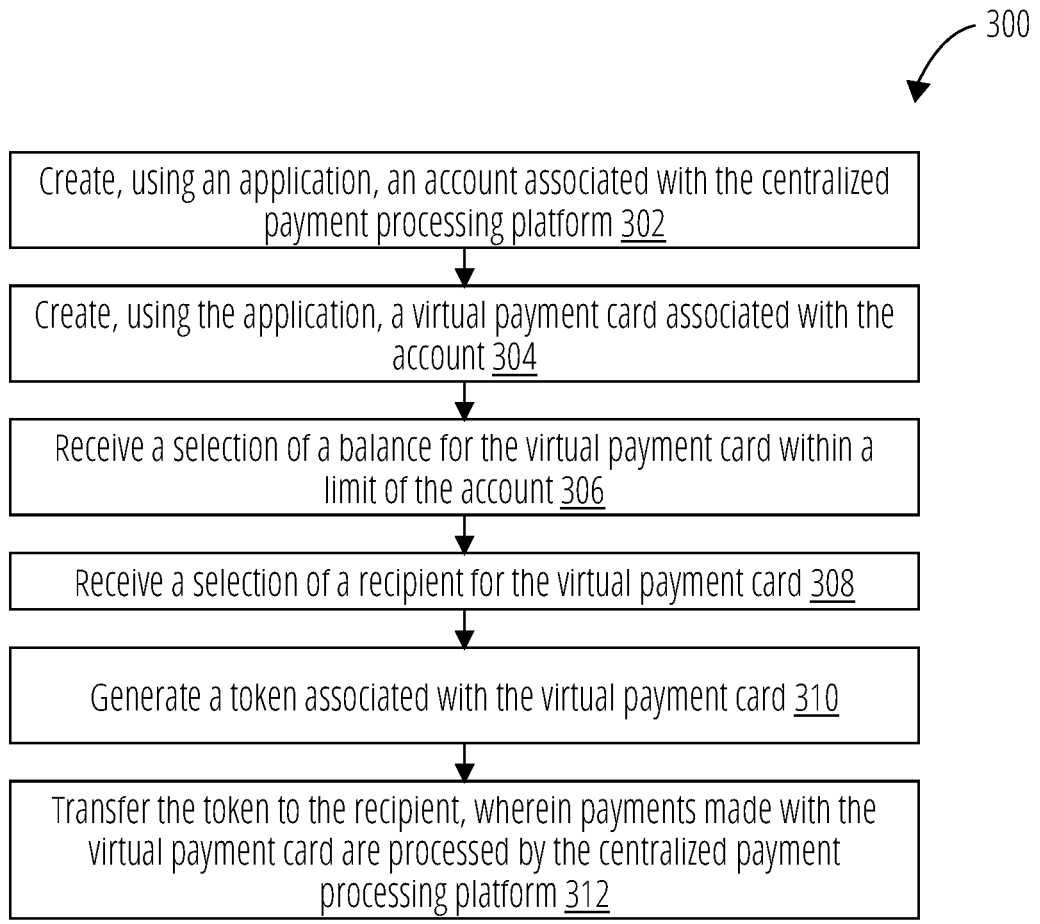
FIG. 3 is a flow chart illustrating a method for distributed payment processing using a centralized payment processor, according to an example embodiment.

FIG. 3 is a flow chart of a method 300 for distributed payment processing using a centralized payment processing platform, according to an example embodiment. In some embodiments, the operations may be combined, performed in parallel, or performed in a different order. The method 300 may also include additional or fewer operations than those illustrated. The method 300 may be performed by processing logic that may include hardware (e.g., decision making logic, dedicated logic, programmable logic, and microcode), software (such as software run on a general-purpose computer system or a dedicated machine), or a combination of both.

The method 300 may commence with creating an account with the centralized payment processing platform, as shown in block 302. The account may be created using an application running on a user device of a user and using a platform 200. In an example embodiment, the creation of the account may include performing an authentication procedure, an identification procedure, and other procedures needed for security or other purposes. In an example embodiment, the account may be associated with a payment card of the user, such as a debit card or a credit card.

The method 300 may further include creating a virtual payment card associated with the account, as shown in block 304. The virtual payment card may be created using the application running on the user device of the user and using a platform 200. In block 306, the method 300 may include receiving, from the user, a selection of a balance for the virtual payment card within a limit of the account. In particular, the user may specify or enter the balance that the user wants to be present on the virtual payment card. The method 300 may further include receiving, from the user, a selection of a recipient for the virtual payment card, as shown in block 308.

Upon receiving the selection of the balance and the recipient from the user, the method 300 may continue with creating a token associated with the virtual payment card, as shown in block 310. In an example embodiment, the token may be generated by the centralized payment processing platform itself or by a partner financial institution. The partner financial institution may be a local financial institution, a foreign financial institution, and so forth.

In block 312, the method 300 may include transferring the token to a further user device associated with the recipient. Upon receiving the token by the further user device, the virtual payment card having the balance may be made available to the recipient on the further user device. The recipient may use the virtual payment card to perform payments within the limit of the balance. The payments made with the virtual payment card may be processed by the centralized payment processing platform. In an example embodiment, the user and the recipient may be located in different countries. The payments may be made by the recipient in a foreign country (i.e., not the country where the user is located) and in a currency associated with the foreign financial institution. In an example embodiment, the payments may be performed using the Near-field communication (NFC).

In an example embodiment, the method 300 may further include receiving, from the recipient, a request to associate the virtual payment card with a digital wallet. Based on the request, the centralized payment processing platform may associate, via the application, the virtual payment card with the digital wallet. The digital wallet may include one of the following: Samsung Pay®, Apple Pay®, Google Pay®, Silkpay®, and the like.

In an example embodiment, the method 300 may include importing the virtual payment card into the digital wallet automatically via the application installed on the further user device associated with the recipient. In another example embodiment, the method 300 may include enabling the recipient to enter the virtual payment card into the digital wallet manually upon receipt of the token.

In an example embodiment, the method 300 may include retaining transactions associated with the virtual payment card in a transaction history associated with the account. In a further example embodiment, the method 300 may include making transactions associated with the virtual payment card applicable to participate in at least a cashback program and a credit history. Therefore, the transactions may be made transparent for purposes of the cashback program and the credit history.

FIGS. 4-7 show user interfaces used for registration of a user in the platform 200, according to an example embodiment. The user interfaces shown in FIGS. 4-7 may be associated with an application running on a user device of a user and a further user device of a recipient. The application may be associated with the platform 200.

FIG. 4 shows a user interface 402 that includes an invitation for the user to log in using a log in icon 404 (if the user is already registered in the platform 200) or register using a register icon 406. The registration may include creation of an account associated with the platform 200 for the user.

After the user selects, e.g., via tapping 408, the register icon 406, a user interface 502, shown in FIG. 5, may be presented to the user. The user interface 502 may prompt the user to enter a phone number into a phone number field 504, enter a password into a password field 506, and re-enter the password into a re-enter password field 508. After entering the phone number and the password and re-entering the password, the user may select, e.g., by tapping 510, a send SMS icon 512 to confirm the phone number.

Upon tapping the send SMS icon 512, a user interface 602, shown in FIG. 6, may be presented on the user device to the user. The user device may receive an SMS with a security code 604. The user interface 602 may present a message 606 asking the user to enter the security code 604 in order to confirm the phone number and set up the account of the user. The user may enter the security code 604 into a security code field 608 on the user interface 602 and select, e.g., by tapping 610, a next icon 612.

Upon tapping on the next icon 612, a user interface 702, shown in FIG. 7, may be provided on the user device to the user. The user interface 702 may display a message 704 asking the user to provide information needed to setup the account. The user may enter a full name into a full name field 706, enter an email into an email field 708, enter a country of residence into a country field 710, and select the currency to be associated with the account in a currency field 712. Upon providing the information, the user may select, e.g., by tapping 714, a register icon 716 to register the account.

Upon tapping on the register icon 716, a user interface 802, shown in FIG. 8, may be provided on the user device to the user. The user interface 802 may display a message 804 stating that the registration was successful. The user may select, e.g., by tapping 806, a next icon 808 to open a user interface 902.

FIGS. 9-12 show user interfaces that illustrate purchasing a prepaid card by the user, i.e., creating the prepaid card associated with the user by the platform 200, according to an example embodiment. The prepaid card may be used as a virtual payment card. FIG. 9 is a user interface 902 that shows, in a total balance field 904, a total amount of funds in all payment cards associated with the user. The payment cards may include cards purchased by the user, shown as "My cards" 906, cards shared by the user with other users, shown as "Shared" 908, and cards requested by the user from other users, shown as "Requested" 910.

The user interface 902 enables the user to request to create the virtual payment card. The user may select, e.g., by tapping 912, a field 914 to request the platform 200 to create the virtual payment card.

Upon selecting the field 914, a user interface 1002, shown in FIG. 10, may be displayed on the user device to the user. The user interface 1002 may include a picture of the virtual payment card shown as a payment card 1004 and a create card icon 1006. The user may select a currency for the payment card 1004 in a currency selection field 1010. The user may further manually enter an amount to be deposited into the payment card 1004 in an amount field 1012.

Upon selecting the currency and the amount and selecting, e.g., by tapping 1008, the create card icon 1006, a user interface 1102, shown in FIG. 11, may be displayed on the user device to the user. The amount entered into the amount field 1012 is an amount of funds that the user wants to deposit into the account created by the user in the platform 200 and to be available on the payment card 1004. The user may deposit funds into the account by associating any existing payment card of the user in any financial institution with a user profile and the account in the platform 200. The user may enter the details of the existing payment card into a bank card field 1104.

Upon entering the details of the existing payment card into a bank card field 1104 as shown in a user interface 1202, shown in FIG. 12, the user may select, e.g., by tapping 1204, a create card icon 1206 to initiate transferring money in the amount entered by the user in the amount field 1012 from the bank card field 1104 of the user in any financial institution to the payment card 1004.

Upon selecting the create card icon 1206, a process of verification of the user may be initiated to authorize a transfer from the bank card field 1104 of the user to the payment card 1004. FIGS. 13-17 show user interfaces that illustrate verification of identity of the user, according to an example embodiment. First, a user interface 1302, shown in FIG. 13, may be displayed on the user device to the user. The user interface 1302 may display a notification 1304 inviting the user to pass the verification or to continue as anonymous user. The user may select, e.g., by tapping 1306, a verify account icon 1308 to initiate the identity verification of the user. If the user wants to continue an as anonymous user, the user may tap an anonymous icon 1310.

Upon clicking the verify account icon 1308, a user interface 1402, shown in FIG. 14, may be displayed on the user device to the user. The user interface 1402 may show several available steps of verification, where one step is verifying an identity document and another step is biometrical verification of the user. To pass the identity document verification, the user may select an ID field 1406 if the users wants to provide a national ID document or select a passport field 1408 if the user wants to provide a passport.

Upon selection of the ID field 1406 or the passport field 1408, a user interface 1502, shown in FIG. 15, may be provided to the user. The user interface 1502 may show a capture field 1504 and a camera icon 1506. Upon selection of the capture field 1504 by the user, a camera of the user device may be activated. The user may place the national ID document or the passport in front of the camera such that the document can be seen in the capture field 1504. Upon placing the document in front of the camera, the user may select the capture field 1504 to capture an image of the document by the camera. Upon capturing the image of the document, the user may tap a continue field 1508. Upon selection the continue field 1508, the national ID document or the passport can be sent to a remote server by the platform 200 for verification. In some embodiments, the platform 200 may require the user to provide both the national ID document and the passport.

Upon selection of the face verification field 1410 shown in FIG. 14 or upon selecting the continue field 1508 shown in FIG. 15, a user interface 1602, shown in FIG. 16, can be displayed to the user. A camera of the user device may be activated and the face 1604 of the user may be displayed on the user interface 1602. The user interface 1602 may further display an instruction 1608 to place the face 1604 in an oval 1610 and click a button 1606 when the oval 1610 is colored yellow (i.e., after the camera has focused on the face 1604 of the user). After clicking the button 1606, 1506, one or more images of the face 1604 of the user may be sent to a remote server by the platform 200 to complete face verification. In an example embodiment, the face verification may include scanning the face or some portions of the face, such as eyes, mouth, and the like. In an example embodiment, the platform 200 may send the national ID document or the passport and send pictures of the face of the user to the remote server simultaneously, upon scanning the face of the user.

After the identity document verification and the face verification are completed, a user interface 17021, shown in FIG. 17, may be displayed to the user. The user interface 1702 may include a notification 1706 informing that the verification of the national ID document is completed, a notification 1708 informing that the verification of the passport is completed, and a notification 1710 informing that the face verification is completed. The user may select, e.g., by tapping 1704, a done button 1712 to complete the verification process.

Upon the verification, the process of purchasing the prepaid card by the user may continue. FIGS. 16-18 show user interfaces that illustrate completion of purchasing of the prepaid card by the user. Upon clicking the done button 1712, a user interface 1802, shown in FIG. 18, may be displayed on the user device to the user. The user interface 1802 may show an amount 1804 to be transferred to the payment card 1004 and the bank card field 1104 representing information of the existing payment card, such as a bank card, previously entered by the user. The user may select, e.g., by tapping 1806, a create card icon 1808 to confirm transferring of funds to the payment card 1004.

Upon tapping the create card icon 1808, a user interface 1902, shown in FIG. 19, may be displayed to the user. To initiate the money transfer from the bank card field 1104 of the user to the payment card 1004, the user may select, e.g., by tapping 1904, a create card icon 1906.

Upon selecting the create card icon 1906, the money transfer may be performed and a user interface 2002, shown in FIG. 20, may be presented to the user on the user device. The user interface 2002 may display a notification 2004 stating that the user has purchased the prepaid card and showing the amount of money on the prepaid card. The user may select, e.g., by tapping 2006, a done icon 2008 to complete the purchasing process.

In an example embodiment, the payment card 1004 issued for the user may include a debit or credit card authorized by an international payment system, such as MasterCard®, Visa®, and so forth. After purchasing the payment card 1004, the user can share any portion of the amount of funds deposited on the payment card 1004 with any person.

If the payment card 1004 is a debit card, the user may share the money deposited onto the debit card with recipients within the limit of the balance of the payment card 1004. If the payment card 1004 is a credit card, the payment card 1004 may have a credit limit provided to the user by an issuer of the credit card, e.g., by a bank. The user may create a plurality of additional cards with a balance limited by the credit limit of the payment card 1004. In fact, the user may take a cash loan from a bank and share the cash loan with a recipient. For example, the user may have a credit limit of 10,000 USD provided for the payment card 1004 by the bank. This means that the user can take a 10,000 USD loan from the bank, which can be deposited onto the payment card 1004 of the user. The user may want to share the credit money with recipients. To share credit money, the user may create an additional payment card and specify a balance for the additional payment card within the credit limit of the payment card 1004. For example, the user may select a balance of 1,000 USD for the additional payment card. This balance is a credit limit selected by the user for the additional payment card. Upon specifying the balance, the user may share the additional payment card with a recipient. Thus, the recipient does not need to have any bank accounts or credit cards to take a cash credit. Instead, the recipient may use a user device (e.g., a smartphone) with an application associated with the platform and running on the user device in order to access the additional payment card having the credit limit specified by the user.

Banks usually provide benefits to users for using the credit money of a credit card. Therefore, after the user shares the credit money with the recipient by sharing the additional credit card and after the recipient uses the credit money of the additional payment card for paying for products and services, the bank may reward the user for using the credit money. Banks may be interested in incentivizing the users to share the credit money with recipients by sharing the additional credit cards because this may increase the amount of cash credit money requested by users from the bank.

FIGS. 21-23 illustrate user interfaces that show a process of sharing the money with any person the user wants by sharing access to a card of the user, according to an example embodiment. Upon completion of the card purchasing process, a user interface 2102, shown in FIG. 21, may be displayed to the user. The user interface 2102 may show the amount 2108 of money on the account of the user, i.e., on the payment card 1004 associated with the account of the user. To initiate a money sharing process, the user may select, e.g., by tapping 2104, a share icon 2106. Upon tapping 2104 the share icon 2106, the process of sharing money may be initiated and a user interface 2202, shown in FIG. 22, may be presented to the user.

FIG. 22 shows the user interface 2202 that includes fields to be filled by the user for sharing the money. The fields include a recipient selection field 2204, a payment card 1004, an amount in card field 2206, and a message to the recipient 2208. The user may fill in the recipient selection field 2204, the payment card 1004, the amount on card field 2206, and the message to the recipient 2208.

In an example embodiment, upon tapping the recipient selection field 2204, the user may select the recipient from a list of contacts of the user or a list of contacts with which the user previously shared money. In an example embodiment, the user may directly enter a phone number of the recipient without selecting the recipient from the list.

FIG. 23 illustrates a user interface 2302 that shows fields filled in by the user, specifically, the recipient selection field 2204, the payment card 1004, the amount in card field 2206, and the message to the recipient 2208. To confirm sending the request to initiate the money sharing process, the user may select, e.g., by tapping 2306, a share icon 2304.

In an example embodiment, upon receiving a request of the user to initiate the money sharing process, the platform 200 may generate a token associated with the payment card 1004 of the user. In some embodiments, the platform 200 may request a partner financial institution (e.g., an international payment system such as MasterCard® or Visa®) to create the token associated with the payment card 1004 of the user. The partner financial institution may generate the token and send the token to the platform 200.

The platform 200 may provide the token to the user device of the user. The token associated with the payment card 1004 may be represented in a form of an additional virtual payment card. Specifically, the user interface 2202 may include a representation of the token in the form of one or virtual payment cards in a list named "Shared" 908 as shown in FIG. 21. The platform 200 may provide the token associated with the payment card 1004 to the further user device of the recipient.

FIGS. 24-26 illustrate requesting a recipient to share a virtual payment card with a user, according to an example embodiment. The platform 200 may enable the user to request access to further virtual payment cards associated with further users. Specifically, the user may request a further user to share a virtual payment card of the further user with the user. The user may select the further user from a contact list or enter a phone number of the further user. Upon selection of the further user by the user, the platform 200 may send a notification to the further user informing the further user that the user has requested to share a virtual payment card with the user. Upon receiving the notification, the further user may share the virtual payment card with the user by performing the steps similar to those illustrated in FIGS. 21-23.

FIG. 24 shows a user interface 2402 configured to enable a user to request one or more recipients to share payments cards of the recipients with the user, according to an example embodiment. To initiate request to share virtual payment cards with the user, the user may select, e.g., by tapping 2404, a request icon 2406. Upon tapping the request icon 2406, the process of requesting to share money may be initiated and a user interface 2502, shown in FIG. 25, may be presented to the user.

FIG. 25 shows a user interface 2502 configured to enable the user to select a recipient of the request to share a virtual payment card with the user, according to an example embodiment. The user interface 2502 includes fields to be filled by the user. The fields include a recipient selection field 2504, an amount in card field 2506 relating to the amount of funds to be requested by the user, and a message to the recipient 2508. The user may fill in the recipient selection field 2504, the amount on card field 2506, and the message to the recipient 2508.

In an example embodiment, upon tapping the recipient selection field 2504, the user may select the recipient from a list of contacts of the user or a list of contacts from which the user previously requested money. In an example embodiment, the user may directly enter a phone number of the recipient without selecting the recipient from the list.

FIG. 26 illustrates a user interface 2602 that shows fields filled in by the user, specifically, the recipient selection field 2504, the amount on card field 2506, and the message to the recipient 2508. To confirm sending of the request to initiate the recipient-to-user money sharing process, the user may select, e.g., by tapping 2606, a request icon 2604.

In an example embodiment, upon receiving a request of the user directed to the recipient, the platform 200 may provide the request to a further user device of the recipient. If the recipient agrees to share money with the user in response to the request received from the user, the platform 200 may generate a token associated with a payment card of the recipient. The platform 200 may provide the token to the user device of the user. The token may be presented to the user as one of virtual payment cards in a list named as "Requested" 910, as shown in FIG. 24.

FIGS. 27-29 show user interfaces for reviewing cards by a user, according to an example embodiment. In an example embodiment, the user may buy more than one payment card. The user may access payment cards by tapping a "my cards" icon 2408 shown on the user interface 2402 in FIG. 24. Upon tapping the "my cards" icon 2408, the user interface 2702, shown in FIG. 27, may be provided to the user. The user interface 2702 may display a list of all cards associated with the user. The cards may include prepaid cards bought by the user, cards shared by the user with recipients, and cards requested by the user from other users (i.e., cards shared by other users with the user). The user may tap a "my cards" icon 2704 to access a list 2706 of prepaid cards purchased by the user. The user interface 2702 may further show a total amount 2708 of money present on all payment cards of the user.

Upon tapping a "shared cards" icon 2710 shown on the user interface 2702, a user interface 2802, shown in FIG. 28, may be provided to the user. The user interface 2802 may further show a total amount 2806 of money shared by the user with recipients. The user interface 2802 may show a list 2804 of recipients with which the user shared additional cards. The list 2804 may include a name and a phone number of a recipient and an amount of money left of an additional card shared by the user with the recipient.

Upon selecting a field 2808 associated with a recipient, the user may open a menu related to the additional card of the recipient and perform operations with respect of the additional card of the recipient. For example, the user may rename the card, review a payment history of payments performed by the recipient using the additional card, close the additional card, and so forth.

Upon tapping a "requested cards" icon 2712 shown on the user interface 2702, a user interface 2902, shown in FIG. 29, may be provided to the user. The user interface 2902 may further show a total amount 2906 of money shared by other users with the user. The user interface 2902 may show a list 2904 of other users that shared additional cards which the user. The list 2904 may include a name and a phone number of another user and an amount of money left of an additional card shared by others user with the user.

Upon selecting a field 2908 associated with an additional card shared by the other user with the user, the user may open a menu related to the additional card and perform operations with respect of the additional card. For example, the user may review card details, transfer funds from the card, rename the card, review a payment history of payments performed using the card, and so forth.

FIGS. 30-32 show user interfaces provided on a further user device of a recipient 106 and illustrating receiving an access by the recipient to a shared amount of money shared by the user. FIG. 30 is a user interface 3002 showing a notification 3006 stating that the amount of money was shared with the recipient. The notification 3006 may be displayed upon receiving the token by the further user device of the recipient sent by the user device of the user. In an example embodiment, the user device of the user may send the token to the platform 200 and the platform 200 may send the token to the further user device of the recipient. In an example embodiment, the token can be represented in a form of an additional card.

In an example embodiment, the recipient may not have an application associated with the platform 200 running on the further user device of the recipient. In this embodiment, upon receiving the notification 3006, which may include data of the additional card, the recipient may associate the "requested cards" icon 3104 with a digital wallet (not shown) of the recipient. The digital wallet may include Samsung Pay®, Apple Pay®, Google Pay®, and the like. In some embodiments, the recipient may need to manually enter the data of the "requested cards" icon 3104 into the digital wallet.

Upon opening of the notification 3006, e.g., by tapping 3004, a user interface 3102, shown in FIG. 31, may be presented to the recipient on the further user device. In an example embodiment, based on the token received by the further user device, an additional card may be imported into the digital wallet automatically via the application associated with the platform 200 installed on the further user device of the recipient. The user interface 3102 may show the balance 3108 of money associated with all cards of the recipient. Upon selecting, e.g., by tapping 3106, a "requested cards" icon 3104, a user interface 3202 may be displayed to the recipient.

FIG. 32 shows the user interface 3202 that may display an additional card 3204 having the balance 3108. The additional card 3204 is a card shared by the user with the recipient. The additional card 3204 includes the amount of money shared with the recipient by the user.

FIGS. 33-35 show user interfaces provided on a user device of a user and illustrating replenishments of virtual payment cards. FIG. 33 illustrates a user interface 3302 enabling the user to replenish a virtual payment card. Upon selecting "my cards" icon 3308, a total amount 3310 of money in all virtual payment cards of the user may be shown. The user interface 3302 may further show a virtual payment card 3304 of the user and a card replenishment field 3306. Upon tapping the card replenishment field 3306, a user interface 3402 may be provided to the user.

FIG. 34 illustrates a user interface 3402 enabling the user to enter the amount of money to be replenished to the virtual payment card 3304. The user interface 3402 may show an "enter amount" field 3404. The user may enter the amount into the "enter amount" field 3404 and tap the card replenishment field 3306.

Upon selecting the card replenishment field 3306, a user interface 3502, shown in FIG. 35, may be provided to the user. The user interface 3502 may show a bank card field 3504. The user may enter information of a bank card from which the money should be replenished into the virtual payment card 3304 and tap the card replenishment field 3306. Upon tapping the card replenishment field 3306, the process of replenishment of the virtual payment card 3304 may be initiated by the platform 200.

FIGS. 36-37 show user interfaces provided on a user device of a user and illustrating transfer of money between virtual payment cards. FIG. 36 illustrates a user interface 3602 enabling the user to perform a transfer between virtual payment cards. Upon selecting "my cards" icon 3608, a total amount 3610 of money in virtual payment cards marked as "my cards" of the user may be shown. The user interface 3602 may further show a virtual payment card 3604 of the user and a transfer icon 3606. Upon tapping the transfer icon 3606, a user interface 3702 may be provided to the user.

FIG. 37 illustrates a user interface 3702 enabling the user to select virtual payment cards for the transfer. The user may select a virtual payment card from which the transfer should be performed by using a first card field 3704. The user may select a virtual payment card from which the transfer should be performed by using a second card field 3706. The user may enter the amount be transferred into an enter amount field 3708. The user may tap the transfer icon 3606 to initiate the transfer between the selected virtual payment cards.

FIGS. 38-41 illustrate a process of performing a payment by a recipient using the "requested cards" icon 3104, according to an example embodiment. FIG. 38 shows a user interface 3802 that enables the recipient to pay using any of "my cards" of the recipient, shared cards, or requested cards. The user interface 3802 may show a balance 3108 of funds on all cards of the recipient. To perform the payment from one of "my cards" of the recipient, the recipient may select, e.g., by tapping 3804, an NFC icon 3806 to switch on an NFC on the further user device of the recipient.

FIG. 39 shows a user interface 3902 presented on the further user device 110 upon activating the NFC. To perform a payment, the recipient may bring the further user device 110 of the recipient close to a Point-of-Sale (POS) terminal 3904 of a product or service provider, as schematically shown in FIG. 39.

FIG. 40 shows a user interface 4002 presented on the further user device 110 upon performing the payment. The user interface 4002 may show a notification 4004 presented on the further user device 110 and informing the recipient that the payment has been performed successfully.

The payment may be performed as follows. Upon activating the NFC, the digital wallet with the "requested cards" icon 3104 added to the digital wallet may be activated on the further user device 110. When the recipient brings the further user device 110 close to the POS terminal 3904, the POS terminal 3904 may read, via the NFC, the token associated with the "requested cards" icon 3104 from the further user device 110. Upon reading the token, as the token is associated with the virtual payment card of the recipient, which in turn is associated with the account of the user, the payment may be performed by transferring money from the account of the user to an account of the product or service provider associated with the POS terminal 3904. Therefore, the recipient does not have his own account, but uses the account of the user within the fund limit (i.e., an amount of money) specified by the user to be shared with the recipient.

FIG. 41 illustrates a user interface 4102 that shows a balance 3108 left on the virtual payment cards after performing the payment as illustrated in FIG. 39 and FIG. 40.

In an example embodiment, the recipient may use the virtual payment card to pay online. The recipient may perform online payments by using a digital wallet in which the virtual payment card is stored (e.g., Samsung Pay®, Apple Pay®, Google Pay®) or by manually entering the information of the virtual payment card on a website. The recipient may review the information of the virtual payment card in the application running on the further user device of the recipient.

FIGS. 42-45 show user interfaces provided on a user device of a user and illustrating consolidation of virtual payment cards. FIG. 42 illustrates a user interface 4202 enabling the user to initiate consolidation of virtual payment cards. Upon selecting a "requested" cards icon 4206, a total amount 4208 of money (e.g., 600 USD) on all virtual payment cards requested by the user from other users may be shown. The user interface 4202 may further show a consolidate icon 4204. Upon tapping the 4206, a user interface 4302 may be provided to the user.

FIG. 43 illustrates a user interface 4302 enabling the user to select virtual payment cards to be consolidated. The user may select a first card 4304 (having the amount of, e.g., 300 USD) and a second card 4306 (having the amount of, e.g., 300 USD) that need to be consolidated and may select a third card 4308 (having the amount of, e.g., 300 USD) with which the first card 4304 and the second card 4306 need to be consolidated. Upon selection of the cards, the user may tap the consolidate icon 4204 to initiate the consolidation process. The platform 200 may consolidate the first card 4304 and the second card 4306 with the third card 4308 by transferring money from the first card 4304 and the second card 4306 to the third card 4308.

FIG. 44 illustrates a user interface 4402 presented to the user upon the consolidation. Upon selecting the "requested" cards icon 4206, the total amount 4208 of money on the virtual payment cards requested by the user from other users may be shown. The total amount 4208 may be, e.g., 0 USD as the funds from the requested virtual payment cards have been transferred to one of "my cards" of the user. Upon the consolidation, the first card 4304 and the second card 4306 may be removed from the "requested" cards section available upon tapping the "requested" cards icon 4206.

FIG. 45 illustrates a user interface 4502 presented to the user upon the consolidation. Upon selection of the "my cards" icon 4506, the total amount 4504 of money in the virtual payment cards of the user (marked as "my cards") may be shown. The total amount 4504 may be, e.g., 900 USD as 300 USD have been transferred from the first card and 300 USD have been transferred from the second card to one of "my cards" that had the amount of 300 USD before the consolidation.

Figure 46:
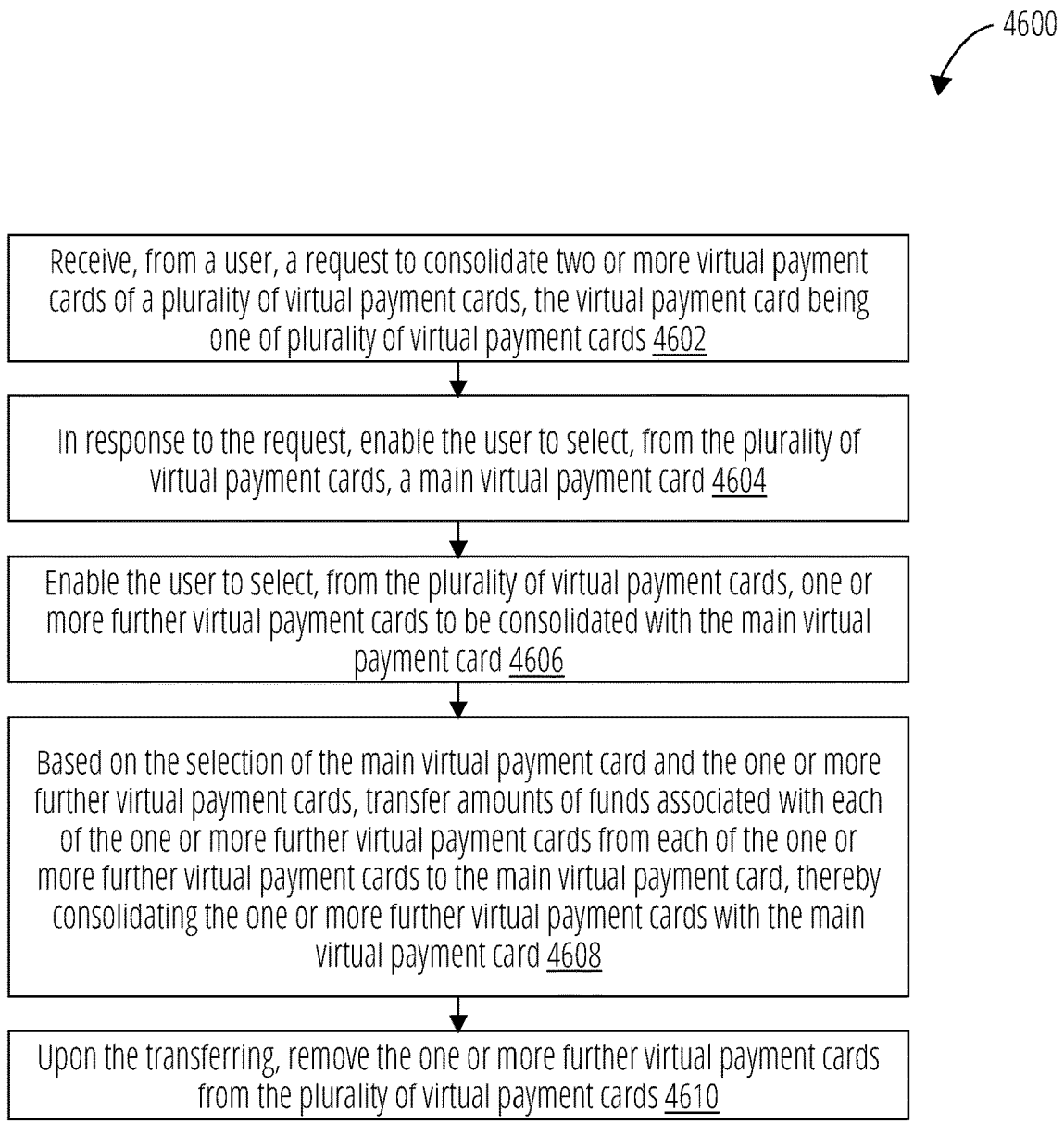
FIG. 46 illustrates a method for consolidation of virtual payment cards, according to an example embodiment.

FIG. 46 is a flow chart of a method 4600 for consolidation of virtual payment cards, according to an example embodiment. The method 4600 may be a continuation of the method 300 shown in FIG. 3.

The method 4600 may commence with receiving, from a user, in block 4602, a request to consolidate two or more virtual payment cards of a plurality of virtual payment cards. The virtual payment card described with reference to the method 300 may be one of plurality of virtual payment cards.

In block 4604, the method 4600 may proceed with enabling, in response to the request, the user to select, from the plurality of virtual payment cards, a main virtual payment card. In block 4606, the method 4600 may include enabling the user to select, from the plurality of virtual payment cards, one or more further virtual payment cards to be consolidated with the main virtual payment card.

In block 4608, the method 4600 may proceed with transferring amounts of funds associated with each of the one or more further virtual payment cards from each of the one or more further virtual payment cards into the main virtual payment card. The transfer of funds may be performed based on the selection of the main virtual payment card and the one or more further virtual payment cards. Thus, upon the transfer, the one or more further virtual payment cards may be consolidated with the main virtual payment card. In block 4610, the method 4600 may proceed with removing, upon the transfer, the one or more further virtual payment cards from the plurality of virtual payment cards.

Figure 47:
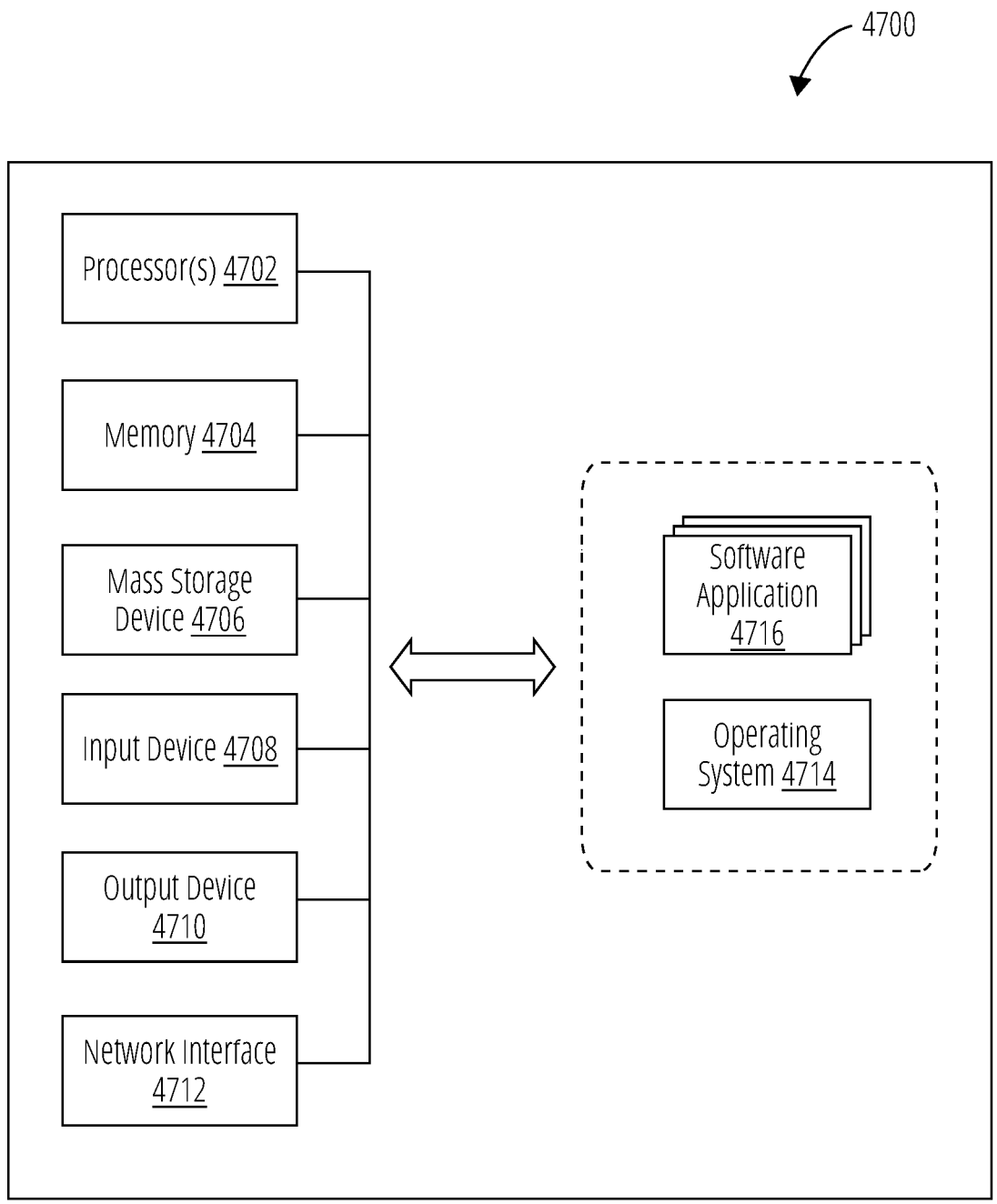
FIG. 47 is a high-level block diagram illustrating an example computer system, within which a set of instructions for causing the machine to perform any one or more of the methodologies discussed herein can be executed.

FIG. 47 is a high-level block diagram illustrating an example computer system 4700, within which a set of instructions for causing the machine to perform any one or more of the methodologies discussed herein can be executed. The computer system 4700 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 4700 is an example of a user device 108, a further user device 110, or a platform 200 shown in FIG. 1. Notably, FIG. 47 illustrates just one example of the computer system 4700 and, in some embodiments, the computer system 4700 may have fewer elements/modules than shown in FIG. 47 or more elements/modules than shown in FIG. 47.

The computer system 4700 may include one or more processor(s) 4702, a memory 4704, one or more mass storage devices 4706, one or more input devices 4708, one or more output devices 4710, and a network interface 4712. The processor(s) 4702 are, in some examples, configured to implement functionality and/or process instructions for execution within the computer system 4700. For example, the processor(s) 4702 may process instructions stored in the memory 4704 and/or instructions stored on the mass storage devices 4706. Such instructions may include components of an operating system 4714 or software applications 4716. The computer system 4700 may also include one or more additional components not shown in FIG. 47.

The memory 4704, according to one example, is configured to store information within the computer system 4700 during operation. The memory 4704, in some example embodiments, may refer to a non-transitory computer-readable storage medium or a computer-readable storage device. In some examples, the memory 4704 is a temporary memory, meaning that a primary purpose of the memory 4704 may not be long-term storage. The memory 4704 may also refer to a volatile memory, meaning that the memory 4704 does not maintain stored contents when the memory 4704 is not receiving power. Examples of volatile memories include random access memories (RAM), dynamic random access memories (DRAM), static random access memories (SRAM), and other forms of volatile memories known in the art. In some examples, the memory 4704 is used to store program instructions for execution by the processor(s) 4702. The memory 4704, in one example, is used by software (e.g., the operating system 4714 or the software applications 4716). Generally, the software applications 4716 refer to software applications suitable for implementing at least some operations of the methods for distributed payment processing using a centralized payment processing platform as described herein.

The mass storage devices 4706 may include one or more transitory or non-transitory computer-readable storage media and/or computer-readable storage devices. In some embodiments, the mass storage devices 4706 may be configured to store greater amounts of information than the memory 4704. The mass storage devices 4706 may further be configured for long-term storage of information. In some examples, the mass storage devices 4706 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 4708, in some examples, may be configured to receive input from a user through tactile, audio, video, or biometric channels. Examples of the input devices 4708 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 4700, or components thereof.

The output devices 4710, in some examples, may be configured to provide output to a user through visual or auditory channels. The output devices 4710 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 4710 may also include a touchscreen, a presence-sensitive display, or other input/output capable displays known in the art.

The network interface 4712 of the computer system 4700, in some example embodiments, can be utilized to communicate with external devices via one or more data networks such as one or more wired, wireless, or optical networks including, for example, the Internet, intranet, LAN, WAN, cellular phone networks, Bluetooth radio, an IEEE 902.11-based radio frequency network, and Wi-Fi Networks®, among others. The network interface 4712 may be a network interface card, such as an Ethernet card, an optical transceiver, a radio frequency transceiver, or any other type of device that can send and receive information.

The operating system 4714 may control one or more functionalities of the computer system 4700 and/or components thereof. For example, the operating system 4714 may interact with the software applications 4716 and may facilitate one or more interactions between the software applications 4716 and components of the computer system 4700. As shown in FIG. 47, the operating system 4714 may interact with or be otherwise coupled to the software applications 4716 and components thereof. In some embodiments, the software applications 4716 may be included in the operating system 4714. In these and other examples, virtual modules, firmware, or software may be part of the software applications 4716.

Thus, systems and methods for distributed payment processing using a centralized payment processing platform have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for distributed payment processing using a centralized payment processing platform comprising a centralized payment processor, the centralized payment processing platform being in communication with a user via a user device of the user and a recipient via a user device of the recipient, the method comprising:
   receiving, by the centralized payment processor, from the user, via an application running on the user device of the user, a request to create an account associated with the centralized payment processing platform;
   in response to the request to create the account, creating, by the centralized payment processor and using the application running on the user device of the user, the account associated with the centralized payment processing platform;
   receiving, by the centralized payment processor from the user, a request to create a virtual payment card associated with the account;
   in response to the request to create the virtual payment card associated with the account, creating, by the centralized payment processor and using the application running on the user device of the user, the virtual payment card associated with the account;
   receiving, by the centralized payment processor, a selection of a balance for the virtual payment card within a limit of the account;
   receiving, by the centralized payment processor, a selection of the recipient for the virtual payment card;
   generating, by the centralized payment processor, a token associated with the virtual payment card, wherein the token includes a dynamically generated unique identifier; and
   transferring, by the centralized payment processor, the token to the recipient via an application running on the user device of the recipient, wherein, based on the token, the user device of the recipient displays the virtual payment card on a user interface of the user device of the recipient, wherein payments made with the virtual payment card are processed by the centralized payment processing platform.

2. The method of claim 1, further comprising:
   receiving, by the centralized payment processor from the recipient, a request to associate the virtual payment card with a digital wallet; and
   based on the request, associating, by the centralized payment processor, the virtual payment card with the digital wallet.

3. The method of claim 2, further comprising importing, by the centralized payment processor, the virtual payment card into the digital wallet automatically via the application running on the user device of the recipient.

4. The method of claim 2, further comprising enabling, by the centralized payment processor, the recipient to enter the virtual payment card into the digital wallet manually upon receipt of the token.

5. The method of claim 1, wherein the account is associated with one of the following: a debit card and a credit card.

6. The method of claim 1, wherein the payments are performed using a Near-field communication.

7. The method of claim 1, wherein creating, by the centralized payment processor and using the application running on the user device of the user, the account associated with the centralized payment processing platform includes performing, by the centralized payment processor, at least an authentication procedure and an identification procedure.

8. The method of claim 1, further comprising retaining, by the centralized payment processor, transactions associated with the virtual payment card in a transaction history associated with the account.

9. The method of claim 1, further comprising making, by the centralized payment processor, transactions associated with the virtual payment card applicable to participate in at least a cashback program and a credit history.

10. The method of claim 1, further comprising enabling, by the centralized payment processor, the user to request access to further virtual payment cards associated with further users.

11. The method of claim 1, further comprising:
   receiving, by the centralized payment processor, from the user, a request to consolidate two or more virtual payment cards of a plurality of virtual payment cards, the virtual payment card being one of the plurality of virtual payment cards;

in response to the request, enabling, by the centralized payment processor, the user to select, from the plurality of virtual payment cards, a main virtual payment card;

enabling, by the centralized payment processor, the user to select, from the plurality of virtual payment cards, one or more further virtual payment cards to be consolidated with the main virtual payment card;

based on the selection of the main virtual payment card and the one or more further virtual payment cards, transferring, by the centralized payment processor, amounts of funds associated with each of the one or more further virtual payment cards from each of the one or more further virtual payment cards to the main virtual payment card, thereby consolidating the one or more further virtual payment cards with the main virtual payment card; and upon the transferring, removing, by the centralized payment processor, the one or more further virtual payment cards from the plurality of virtual payment cards.

12. A centralized payment processing platform for distributed payment processing, the centralized payment processing platform being in communication via a network with a user via a user device of the user and a recipient via a user device of the recipient, the centralized payment processing platform comprising:

a centralized payment processor configured to:
receive, from the user via an application running on the user device of the user, a request to create an account associated with the centralized payment processing platform;
in response to the request to create the account, create, using the application running on the user device of the user, the account associated with the centralized payment processing platform;
receive, from the user, a request to create a virtual payment card associated with the account;
in response to the request to create the virtual payment card associated with the account, create, using the application running on the user device of the user, the virtual payment card associated with the account;
receive a selection of a balance for the virtual payment card within a limit of the account;
receive a selection of the recipient for the virtual payment card;
generate a token associated with the virtual payment card, wherein the token includes a dynamically generated unique identifier; and
transfer the token to the recipient via an application running on the user device of the recipient, wherein, based on the token, the user device of the recipient displays the virtual payment card on a user interface of the user device of the recipient, wherein payments made with the virtual payment card are processed by the centralized payment processing platform; and
a memory in communication with the centralized payment processor, the memory being configured to store instructions executable by the centralized payment processor.

13. The centralized payment processing platform of claim 12, wherein the centralized payment processor is further configured to:
receive, from the recipient, a request to associate the virtual payment card with a digital wallet; and
based on the request, associate the virtual payment card with the digital wallet.

14. The centralized payment processing platform of claim 13, wherein the centralized payment processor is further configured to import the virtual payment card into the digital wallet automatically via the application running on the user device of the recipient.

15. The centralized payment processing platform of claim 13, wherein the centralized payment processor is further configured to enable the recipient to enter the virtual payment card into the digital wallet manually upon receipt of the token.

16. The centralized payment processing platform of claim 12, wherein creating, using the application running on the user device of the user, the account associated with the centralized payment processing platform includes performing at least an authentication procedure and an identification procedure.

17. The centralized payment processing platform of claim 12, wherein the centralized payment processor is further configured to retain transactions associated with the virtual payment card in a transaction history associated with the account.

18. A non-transitory computer-readable storage medium including instructions that, when executed by a centralized payment processor of a centralized payment processing platform that is in communication via a network with a user via a user device of the user and a recipient via a user device of the recipient, cause the centralized payment processor to:
receive, from the user via an application running on the user device of the user, a request to create an account associated with the centralized payment processing platform;
in response to the request to create the account, create, using the application running on the user device of the user, the account associated with the centralized payment processing platform;
receive, from the user, a request to create a virtual payment card associated with the account;
in response to the request to create the virtual payment card associated with the account, create, using the application running on the user device of the user, the virtual payment card associated with the account;
receive a selection of a balance for the virtual payment card within a limit of the account;
receive a selection of the recipient for the virtual payment card;
generate a token associated with the virtual payment card, wherein the token includes a dynamically generated unique identifier; and
transfer the token to the recipient via an application running on the user device of the recipient, wherein, based on the token, the user device of the recipient displays the virtual payment card on a user interface of the user device of the recipient, wherein payments made with the virtual payment card are processed by the centralized payment processing platform.

* * * * *